United States Patent Office 3,420,347
Patented Jan. 7, 1969

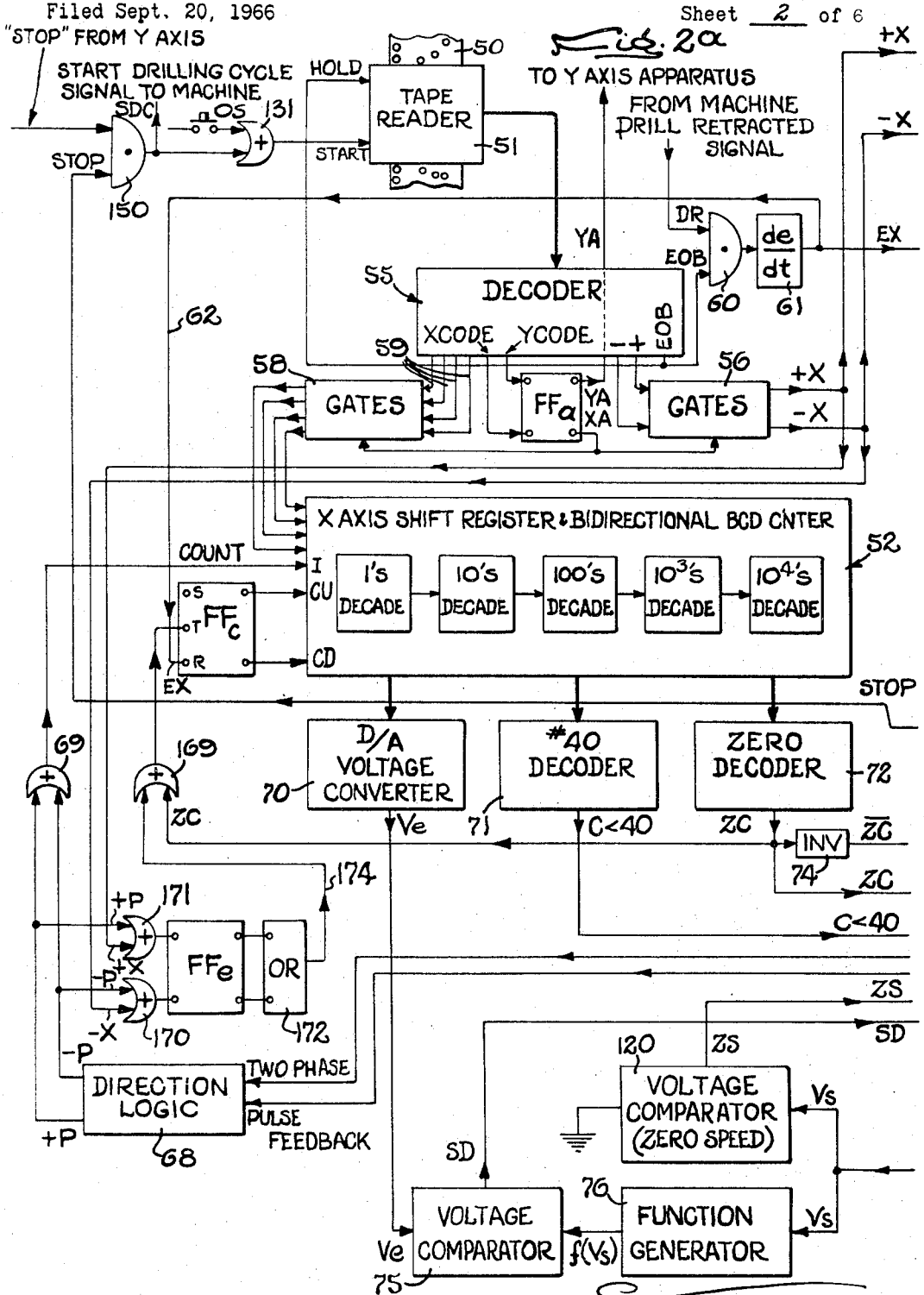

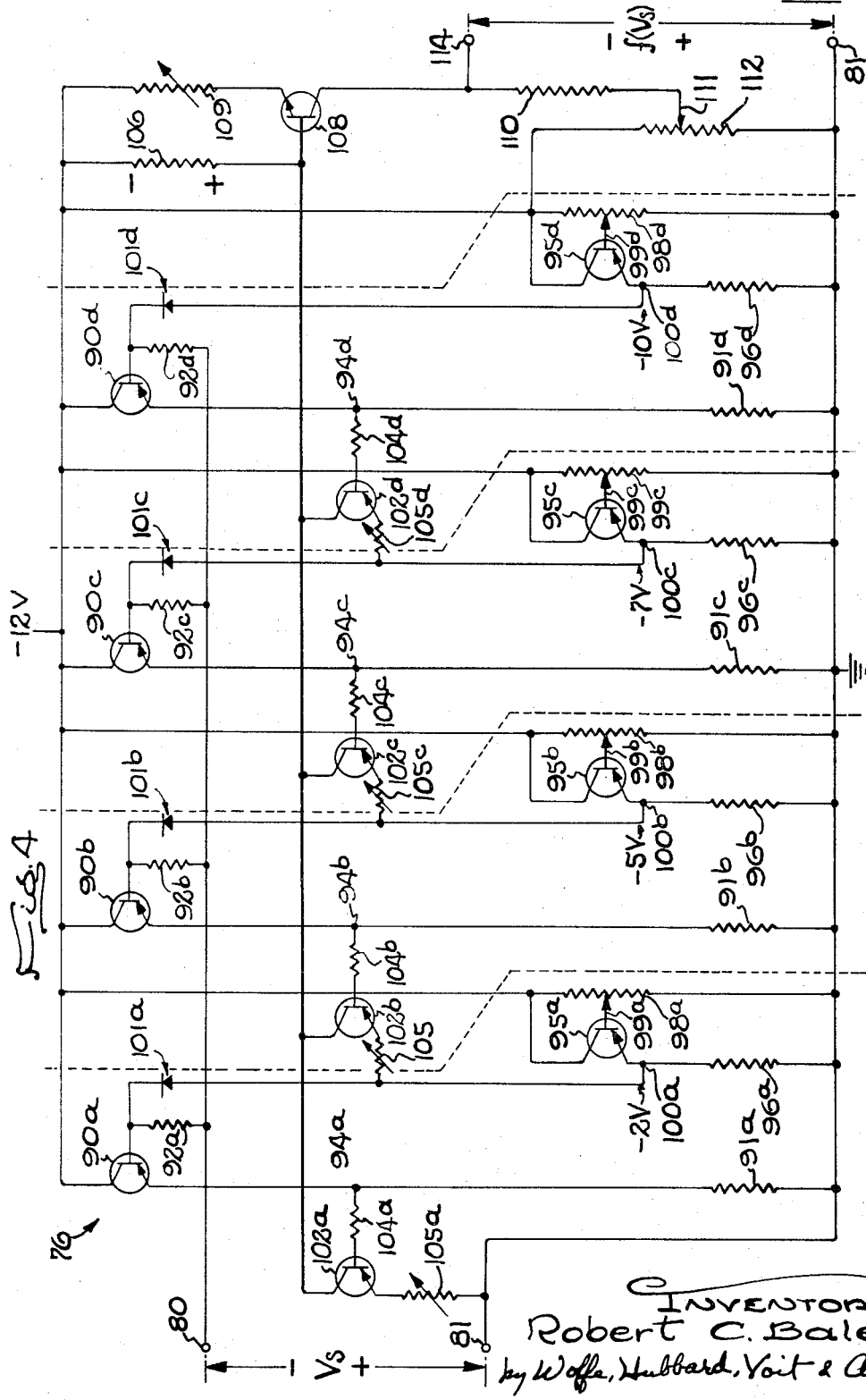

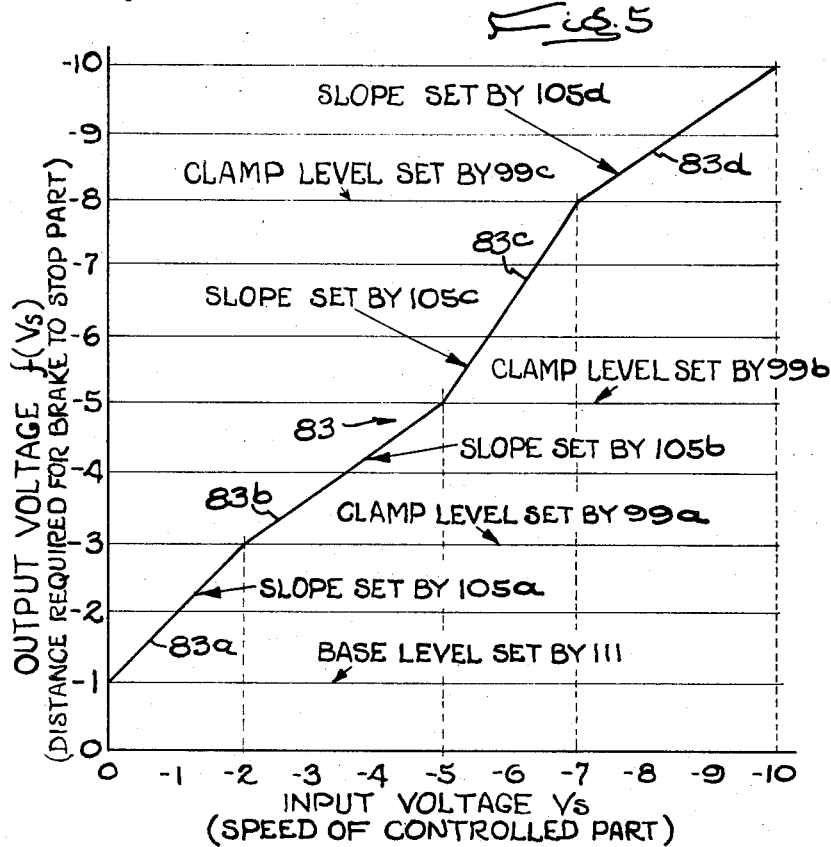
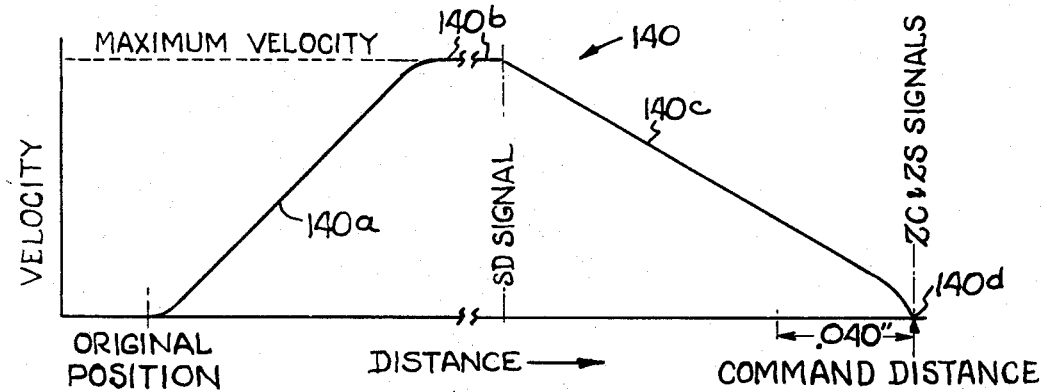

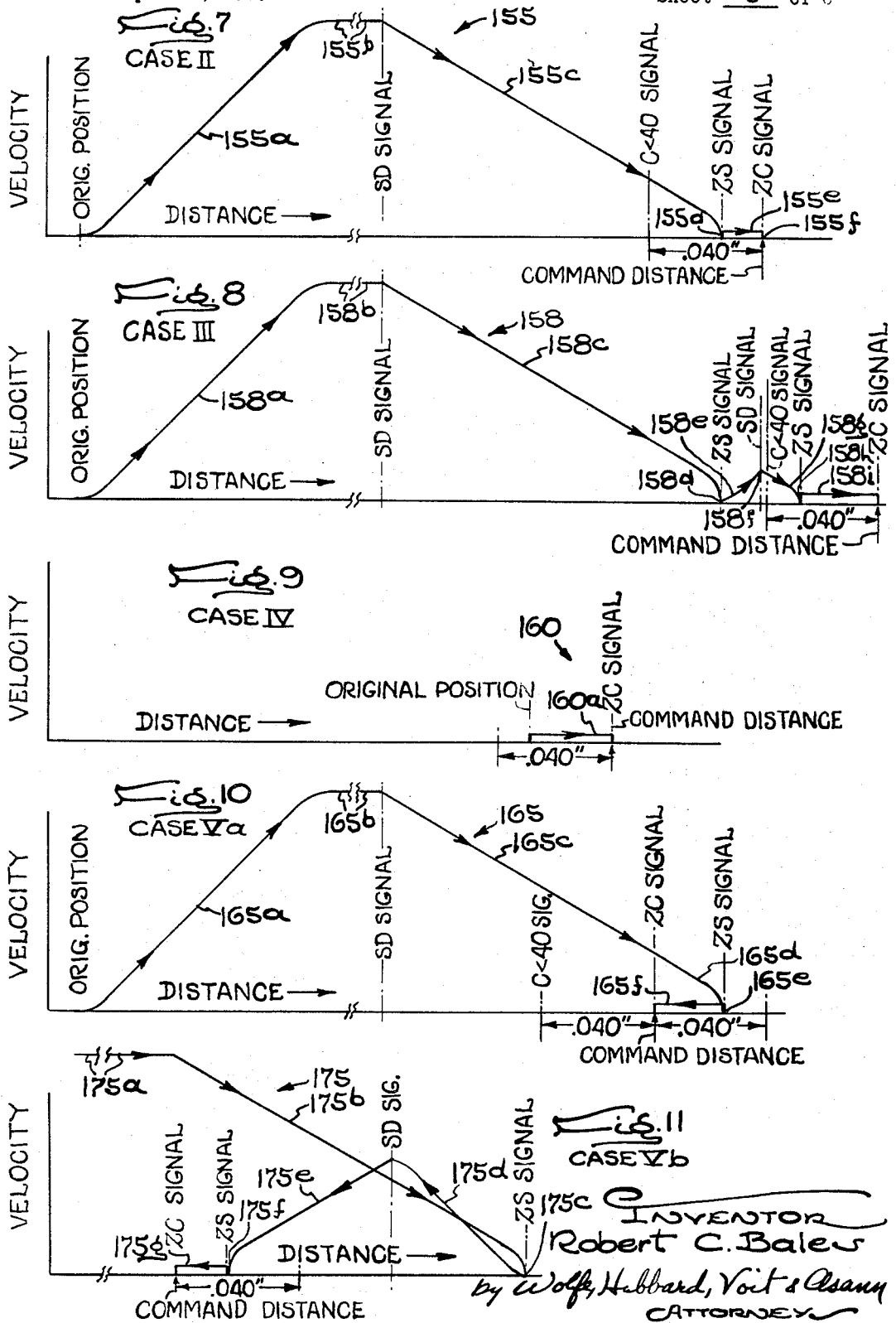

3,420,347
SYSTEM FOR RAPID AND PRECISE
POSITIONING
Robert C. Bales, Rockton, Ill., assignor to Warner Electric
Brake & Clutch Company, South Beloit, Ill., a corporation of Delaware
Filed Sept. 20, 1966, Ser. No. 580,730
U.S. Cl. 192—142                             18 Claims
Int. Cl. F16d 71/00; F16p 3/00

ABSTRACT OF THE DISCLOSURE

The numerically controlled positioning system here disclosed utilizes a selectively engaged electric clutch to transmit driving power from a continuously running motor to traverse the movable part, and a selectively engaged brake to stop the part when the clutch is released. The system includes apparatus to signal continuously the error or difference between (a) a commanded displacement represented by a block of input data signals and (b) the executed displacement through which the controlled part has moved. When input signals are received, the electric brake and the electric clutch are respectively released and engaged, so that the latter drives the part at high speed from the continuously running motor. The velocity of the controlled part is signaled by means such as a tachometer, and this velocity signal is converted by a function generator into a signal $f(Vs)$ which is a monotonic function of the actual velocity, such function being shaped to represent the distance through which the part will travel before stopping if the brake is engaged at an instant when the part is traveling at the signaled velocity. The stopping distance represented by $f(Vs)$ is compared to the signaled displacement error and when the latter becomes substantially equal to the former, the clutch is released and the brake is engaged. This will bring the part to a stop very close to the commanded displacement. But if the error is not then zero, a slow speed stepping motor is pulsed until the signaled error is reduced exactly to zero. In this way, the part travels at near maximum average velocity from one position to the next because the slow speed stepping is required only for a very short portion of the total travel. Cycle time to translate the controlled part from one commanded position to the next is thus made nearly a minimum (for the parameters imposed by the characteristics of the motor, clutch, brake, inertia and friction of the drive train) and the efficiency of machine operation is made to approach a maximum.

Figure 1:
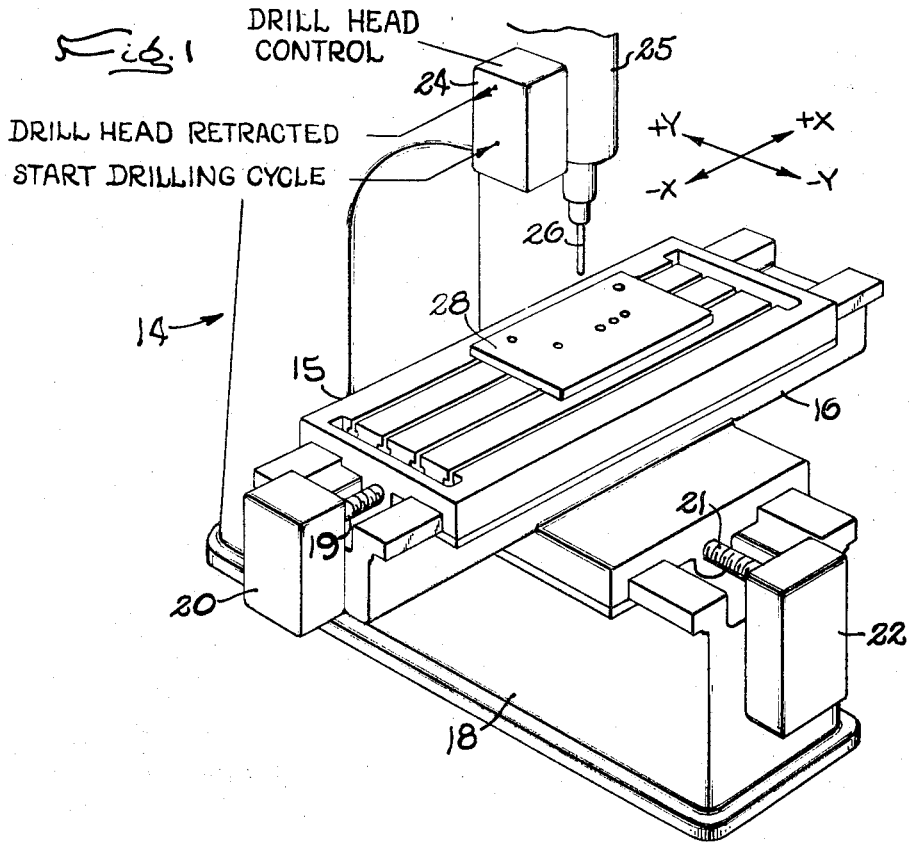

The apparatus includes means for causing drive of the controlled part to reverse if it travels beyond the commanded displacement before stopping by action of the brake. If the part is initially stopped by the brake when the error is not reduced below a predetermined small value, then the clutch is called into play a second time and the brake used to stop the part again, before the stepping motor is actuated to move the part precisely to the commanded displacement.

---

The present invention relates in general to positioning systems, and more particularly to systems of the type wherein a movable part is translated from one position and stopped at a second position displaced by a commanded distance. Although the invention will find use in a variety of applications, it is especially advantageous in what are known as point-to-point numerical control systems for machine tools, and it will herein be described in that exemplary environment.

It is the general aim of the invention to provide control apparatus for moving a part through successive commanded distances to position it at successive points along its path of travel in a manner such that the time required for each positioning operation is reduced to a practical minimum, and yet such that the part is stopped in each new position precisely displaced from its previous position.

A coordinate objective of the invention is to accomplish the foregoing with relatively simple, rugged and low cost apparatus—particularly in that high speed drive for moving the controlled part is obtained from a constantly running motive power source and a clutch-brake arrangement.

Another object of the invention is to provide a point-to-point positioning system in which the movable part is translated at high velocity by clutch drive during a practically maximum proportion of the total time of its movement, thereby to achieve the highest practical average velocity and the shortest total time for executing the commanded displacement.

A related object is to provide such a system in which high speed drive is terminated and the moving part is abruptly braked in a manner such that the part will theoretically come to an initial stop at a location displaced from the starting point by a distance precisely equal to the commanded displacement; but in which any displacement error which exists after such initial stopping will be relatively short and corrected quickly by low speed drive until the commanded displacement is precisely accomplished. By minimizing the distance which the part must travel at low speed to reach its final stopping point, the total time for execution of each displacement operation is significantly reduced.

It is a further object of the invention to continue the high speed drive of a movable part for as long as is practically possible, in view of braking and inertia characteristics of the apparatus, in translating the part through a commanded distance, and then to initiate braking action when the remaining or error distance to be traveled is equal to a monotonic function of the part velocity, so that the part comes to a stop with the error distance reduced to zero or approximately so.

Yet another object is to provide such system in which the average velocity of the positioning movement of a part is kept high, and the time for precisely executing a commanded displacement is kept low, even if the friction and torque characteristics of the brake employed change, by causing a resumption of high speed drive if for any reason the initial stopping of the part leaves it still separated from the desired final stopping position by more than a predetermined amount.

Figure 3:
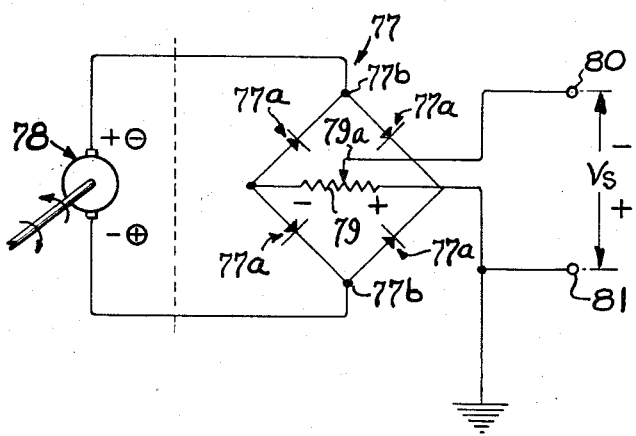
Figure 2B:
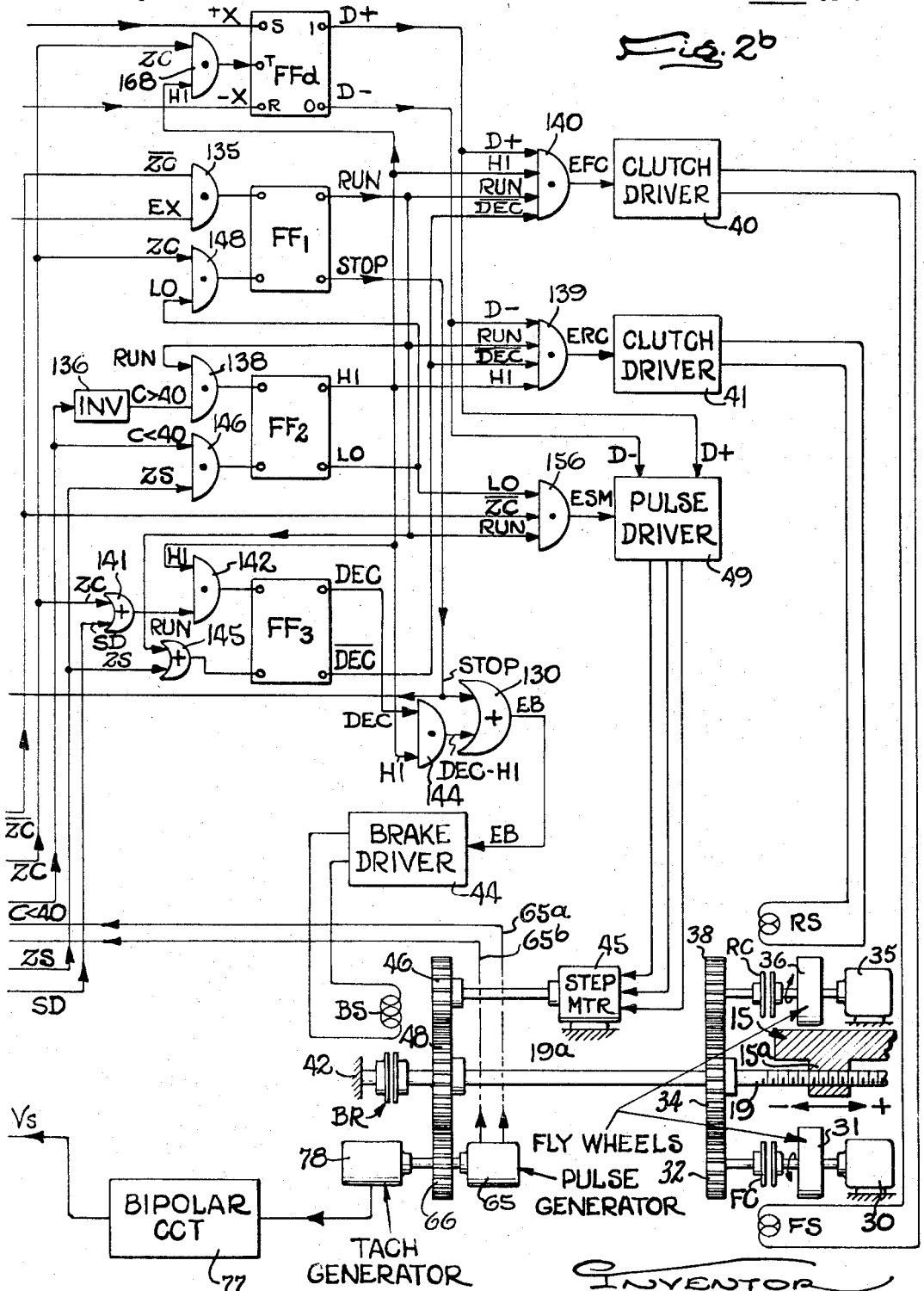

These and other objects and advantages will become apparent from the following detailed description, taken in conjunction with the accompanying drawings, in which FIGURE 1 is a simplified perspective view of a vertical drilling machine having a work table adapted to be moved through successive commanded distances by a control system embodying the present invention;

FIGS. 2a and 2b when joined along the indicated junction line form a diagrammatic block-and-line illustration of a control system constituting an exemplary embodiment of the invention;

FIG. 3 is a schematic diagram illustrating details of a tachometer generator and bi-polar circuit which are generally shown in FIG. 2b;

FIG. 4 a schematic circuit diagram of a function generator shown generally in FIG. 2a;

FIG. 5 is a graphic illustration of a typical monotonic relationship between the input and output of the function generator; and FIGS. 6 through 11 are generalized graphical illustrations of the manner in which the velocity of the movable part varies with the displacement thereof during positioning operations effected by the control system of FIGS. 2a and 2b under different circumstances or cases.

Simply as a concrete example of a device having a movable part or parts to be displaced by successive commanded distances, a vertical drilling machine 14 is shown in FIG. 1 as having a work table 15 movable to the left or right along the ways of a slide 16 which, in turn, is movable inwardly or outwardly along ways formed on a base 18. The table 15 is translated to the left or to the right, here termed movement in −X or +X direction along an X axis, in response to rotation of a lead screw 19 in a reverse or forward direction, the lead screw being coupled to a drive mechanism 20 which will be described in more detail below. The slide 16, and thus the table supported thereon, similarly is translated inwardly or outwardly, here termed movement in a +Y or −Y direction along a Y axis, by a lead screw 21 coupled to a drive mechanism 22.

After each displacement of the table along the X and Y axes, a "start drilling cycle" signal is supplied in a manner to be explained from the control system of FIGS. 2a and 2b, and causes a drill head control 24 to initiate a drilling cycle. Briefly, a drill head 25 carrying a rotating bit 26 is advanced downwardly so that a hole is drilled in a workpiece 28 clamped on the table, and the drilling head is then returned to its upper or home position. Upon such return, the drill head control produces a "drill head retracted" signal which, as hereinafter explained, causes the control system to move the table 15 through the next commanded displacements along the X and Y axes, thereby to locate the workpiece precisely for the drilling of the next hole in the desired location. By supplying successive sets of commanded X and Y displacements from a punched tape or the like, the workpiece can be successively positioned for the successive drilling of holes at a great number of desired locations. The drill head executes each drilling cycle very quickly. The time required for the table 15 to move from one position to the next thus in effect determines how long it may take to drill a given number of holes in a workpiece. It is thus highly desirable to minimize the positioning operation time in order to increase the efficiency and productivity of the drilling machine.

For the purposes of the present description, the table 15 may be considered as a part movable along a predetermined path or X axis to successive positions, and the system for causing the table to execute successive commanded displacements is diagrammatically shown in FIGS. 2a and 2b. Because the control system for positioning the slide 16 along the Y axis may be substantially identical to that for the table 15, the Y axis control components have not been shown, and only brief reference will be made to them in the following description.

Referring now to FIG. 2b, the movable part or table 15 is there shown as having a nut 15a engaged with the lead screw 19 so that rotation of the latter in opposite directions drives the table in positive or negative directions along the X axis. The drive mechanism 20 which acts on that lead screw is shown here in more detail but in diagrammatic form. In order to accelerate and drive the table at a high velocity in a positive direction, a selectively engageable friction clutch FC is interposed between the lead screw and a source of motive power. As here shown, that power source takes the form of a reliable and inexpensive induction motor 30 energized to run continuously and having a flywheel 31 on its output shaft which drives the input member of the clutch FC. When that clutch is engaged, it drives a gear 32 meshed with a mating gear 34 fast on the lead screw, and so drives the latter to translate the table 15 in a positive direction and at a relatively high speed.

Although reverse drive of the table 15 may be provided through reversing gears and a second clutch driven from the same motor, the reverse drive arrangement shown in FIG. 2b includes a second continuously running induction motor 35 having a flywheel 36 connected to the input member of a selectively engageable reverse clutch RC whose output member carriers a gear 38 permanently meshed with the gear 34. The two clutches FC and RC are never both simultaneously engaged. When the clutch FC is engaged and the clutch RC is disengaged, or vice versa, the table 15 will thus be driven in a positive or negative direction and at a relatively high velocity.

Hydraulically actuated clutches may be employed, but those here shown by way of example are electromagnetic friction clutches respectively having coils or solenoids FS and RS. Excitation of these coils by current supplied from clutch driver circuits 40 and 41 in response to enabling signals EFC or ERC respectively causes engagement of the clutches FC and RC. It will be apparent that the use of standard continuously running induction motors 30, 35 and rugged selectively engageable friction clutches FC and RC results in a very simple and relatively inexpensive arrangement for selectively driving the table 15 in either a forward or reverse direction at a high, rapid traverse speed.

In order rapidly to decelerate and stop the table 15 after it has been put in motion, appropriate selectively engageable braking means are coupled with it. As here shown, an electromagnetic friction brake BR having a coil BS excitable to cause engagement is interposed between an extension 19a of the lead screw and a stationary part 42. The brake will be engaged or released in response to the application or removal of an "energize brake" signal EB to the control input line of a brake driver circuit 44.

Whenever the table has substantially completed a commanded displacement, it is desirable to move it at a relatively low velocity so that it can be stopped precisely at the new position without overshooting. As a means for driving the table at such a low velocity, a step motor 45 has its output shaft permanently coupled through gears 46, 48 to the lead screw extension 19a. Stepping motors per se are well known to those skilled in the art, and it will suffice to observe here that the output shaft of the motor 45 steps in one direction or the other in response to time-phased pulses received from a pulse driver circuit 49 when the latter receives an enabling "energize step motor" signal and a direction control signal D+ or D−. Thus, with both clutches FC and RC as well as the brake BR disengaged, the simultaneous appearance of ESM and D+ signals will energize the step motor to drive the table at a low speed in the positive direction (to the right). Similarly, the simultaneous appearance of ESM and D− signals will energize the step motor 45 to drive the table at a low speed in a negative direction (to the left). When the table is being driven due to engagement of the clutch FC or RC and the step motor is ineffective, the rotor of the latter simply rotates idly. This does not adversely affect the high speed drive. Moreover, it may be noted that the use of a step motor is particularly advantageous because the frequency of its stepping action may be readily adjusted, and thus the average value of the low velocity motion of the table may be changed. Also, it is a characteristic of step motors that during those short intervals between energizing pulses their rotors detent or lock, so that the stepping motor itself aids in abruptly stopping the motion of the table 15 after the last of a series of excitation pulses is applied to that motor.

*Symbols and conventions*

Before describing the organization of the control system diagrammatically shown in FIGS. 2a and 2b, certain symbols and conventions will be briefly mentioned. Logical AND and OR devices are there illustrated by conventional symbols respectively containing the corresponding Boolean notations · and +, respectively. The various signals produced by certain components of the apparatus and supplied as inputs to other components (except for analog voltages to be described) are bi-valued, and will be considered here as having under different circumstances either a binary "1" or "0" value (respectively constituted, for example, by +12 volt or 0 volt levels). Each of the various AND circuits (sometimes called gates) produces a binary "1" output signal only when all inputs thereto reside at a binary "1" level. On the other hand, each of the OR circuits produces a binary "1" output signal when any one input is binary "1," and produces a binary "0" output signal only when all such input signals are binary "0's."

Bi-state logic devices in the form of flip-flops (e.g., transistorized Eccles-Jordan circuits) are here illustrated by rectangular blocks containing the symbol FF. The upper and lower terminals at the left side of each rectangle representing a flip-flop device are (as a matter of common convention) considered to be the "set" and "reset" input terminals. It is assumed that when the signal applied to the "set" terminal goes through a transition from the "0" to the "1" level, the flip-flop is set to (or left in) its "1" state. On the other hand, such a transition in the signal applied to the "reset" terminal resets the flip-flop to (or leaves it in) the "0" state. The upper and lower terminals shown at the right side of each flip-flop representing rectangle are assumed to be the "true" and "complement" output terminals. When the device is in its "1" state, the upper and lower terminals will reside at binary "1" and "0" levels, respectively; and when it is in the "0" state, those terminals will reside at "0" and "1" levels, respectively. The middle terminal labeled T at the left side of certain illustrated flip-flops in a "toggle" or "switch" input terminal. A transition of the signal applied thereto from a "0" to a "1" level will cause the flip-flop to reverse its state, i.e., to switch from its existing state to the opposite state.

The details of these standard AND, OR, and FF components are well known to those skilled in the art and they may take any of a variety of specific forms. With the foregoing confirmation of the symbols and conventions here employed, the operation of the control system will become clear from the following description and without any need to refer to specific circuit connections, voltages, and the like.

*Arrangement for accepting displacement commands and signaling the error distance*

In carrying out the invention in one of its preferred forms, provision is made to signal the error distance, i.e., the distance between the commanded distance to be moved and the distance which the controlled part has actually moved. In the arrangement here illustrated, the command distance for each displacement is represented numerically on a record medium such as a punched tape 50, the numerical data being translated into electrical signals by a tape reader 51 and shifted for storage into a combined shift register and bi-directional counter 52. After the commanded distance is thus stored in and signaled by the register-counter, the table 15 is set in motion (in a manner to be explained), and pulse feedback means cause that register-counter to count down by one count for each increment of table movement. Thus, the count stored in and signaled by the register-counter continuously represents the error distance, i.e., the difference between the commanded displacement along the X-axis and the displacement which has been executed at that instant by the table 15.

In more detail, the punched tape 50 may be made up with successive transverse rows of holes punched in different combinations of eight longitudinal channels according to the conventional and well known "EIA format." There will be a "block" of rows on the punched tape for each composite positioning operation along the X and Y axes. That is, each "block" of rows having holes representing different characters or digits includes an X code followed by a + or — code to designate the direction of the commanded X displacement, and followed by a series of codes representing the successively lower order digits of a multi-digit decimal command number. Merely by way of example, if a displacement along the X axis in a positive direction through 8.346 inches is desired, successive coded rows on tthe punched tape would represent the characters X+08346. The same block may contain rows representing a Y axis displacement command, e.g., Y—02589. Each block ends with an "end of block" code row, representing the symbol EOB.

As here shown, the tape reader 51 begins transport and reading of the punched tape 50 in response to a START signal, and it terminates transport and reading of the punched tape in response to a HOLD signal. While the tape reader is operating, its output signals corresponding to the codes represented by successive rows of punched holes are supplied to a decoder 55 which may be of conventional organization well known in the art. When an X code is read from the tape, a momentary signal will appear on the X code output line of the decoder, thus serving to reset (or leave reset) an address flip-flop FFa to its "0" state, thereby producing an XA signal at its reset terminal. This X address signal XA in turn opens sign gates 56 and number gates 58. Therefore, as the next row of the punched tape representing an X axis direction code + or — is read, and a signal appears on the + or — output line of the decoder 55, such signal is transmitted through the open gates 56 to the set or reset terminal, respectively, of a direction flip-flop FFd. This latter flip-flop is thus set to or left in that state which makes its output signal D+ or D— have a binary "1" level, depending upon whether the commanded X displacement is to be in a positive or negative direction. The function of these direction control signals D+ or D— will be treated later.

Next, as the numerical digits of the X command number represented by the succeeding rows of the punched tape are read, the decoder 55 produces momentary signals on different combinations of four output lines 59, such signals representing in binary coded decimal notation the value of the successive decimal digits. These signals are transferred through the open gates 58 to the shift input terminals of the register-counter 52, and they are successively shifted into the latter so that it stores and represents in successive ones of its decade units the successively lower order digits of the X command number.

The organization and operation of a shift register and bi-directional counter such as that here represented at 52 is well known per se to those skilled in the art, and thus it will not be described in detail. It will, of course, be understood that each of the decade units within that counter includes four bi-state devices which by being in the "1" or "0" state can represent in binary coded decimal notation any decimal digit value between 0 and 9. The five decade stages here shown for the register-counter 52 may thus by a shifting operation be set to represent any five place decimal number, although it will be understood that a greater or lesser number of decade stages may be employed.

After an X displacement command number has been read from the punched tape and shifted into the register-counter 52, the continued operation of the tape reader 51 may result in the reading of a Y axis displacement command. The reading of a Y code results in a signal appearing on the Y code output line of the decoder 55 which sets the address flip-flop FFa to its "1" state thereby removing the signal XA and closing the gates 56, 58. Such setting of the address flip-flop FFa produces a signal YA on its "1" output terminal, and this signal may be applied to gates which are included in a Y axis control system (not shown) which is similar to that here illustrated for the X axis. Then the successively lower digits of a Y axis command number read from the punched tape may be shifted into a register-counter for the Y axis control system.

Finally, when the tape reader 51 reads the last row of holes in a given block on the punched tape, the decoder 55 will produce a momentary signal on its terminal EOB. This latter signal is applied as a HOLD signal to the tape reader 51 so that the transport of the tape 50 is halted after one complete block of information has been read. The tape reader 51 will thus remain idle until the next START signal is applied thereto. Also, when the end of a block is reached on the punched tape, the EOB signal is applied to one input of an AND gate 60 which receives on its other input the "drill head retracted" signal DR from the drill head control 24 (FIG. 1) if at that time the drilling head is not executing the cycle of operation but is fully retracted. When the EOB and DR signals are simultaneously present, the output from the AND gate 60 passes through a differentiating circuit 61 to produce a momentary pulse signal EX which commands the system as a whole to begin execution of the commanded displacement. The principal response to the EX signal and the manner in which the movement of the table 15 is initiated in response thereto will be described more fully hereinafter. It will be appropriate to observe at this point, however, that the EX signal is transferred via a line 62 to the reset terminal of a count-control flip-flop FFc, thereby resetting the latter and placing a control terminal CD of the register-counter 52 at "1" level. This signal applied to the control terminal CD conditions the register-counter 52 so that it will count down in response to pulses supplied to its input terminal I, thereby diminishing the number which is stored and signaled by the several decade stages therein.

In order that the number which is stored and electrically represented in binary coded decimal notation by the counter-register will always represent the error distance which is constituted by the difference between the commanded distance and the distance through which table 15 has moved, means are provided to make the register-counter reduce its stored number by one unit in response to each increment through which the table 15 moves. For this purpose, a feedback pulse generator 65 (FIG. 2b) is directly driven from the lead screw 19 through a gear 66 constantly meshed with the gear 48. The pulse generator 65 may be of any suitable type well known to those skilled in the art. Simply by way of example, it may be indicated here that the pulse generator produces one pulse on each of its two output lines 65a, 65b for each .001" of table movement. When the table is moving in a positive direction, the pulses appearing on the output conductor 65a lead in phase the corresponding pulses which appear on the output line 65b; conversely, when the table 15 is moving in a negative direction (to the left), then the pulses appearing on the output line 65a lag in phase those corresponding pulses which appear on the output line 65b. In this way, the feedback pulses from the generator 65 not only indicate the extent of movement of the table 15, but also indicate the direction of that motion.

The pulses appearing on the output line 65a and 65b are supplied to direction logic circuits 68 which sense whether those on the line 65a lead or lag the pulses on the line 65b. In the former case, the direction logic circuitry creates pulses only on its +P output line, there being one pulse for each .001" or table movement. In the latter case, however, the direction logic circuitry 68 produces output pulses only on its —P terminal, there being one pulse for each .001 inch of table movement in a negative direction. In either case, pulses appearing on the +P or —P terminals are transmitted through an OR circuit 69 to the counting input terminal I of the register-counter 52. Thus, the register-counter will receive one input pulse for each .001" of table movement, and with a control signal applied to its terminal CD (as noted above), the register-counter will count down as the table executes the commanded displacement.

By this arrangement, the register-counter 52 will continuously and dynamically signal in binary coded decimal notation a number which represents the difference between the commanded displacement and the displacement which has been executed by the movable part or table 15.

For a purpose which will become apparent below, the number stored and signaled by the register-counter 52 is converted into a corresponding analog form. As here shown diagrammatically, a digital-to-analog voltage converter 70 is connected to all of the bi-state devices in all of the decade units, and it functions to produce an output voltage $V_e$ which, in magnitude, is proportional to the number held in the counter. Such digital-to-analog converters are well known per se in the art, and it will thus be unnecessary to describe the converter 70 in greater detail.

*Creation of a proximity signal*

Means are provided to create a proximity signal whenever the distance error is less than a predetermined small value. For this purpose, a decoder 71 is connected to sense the states of all of the bits in all of the decade units of the counter 52, such decoder being arranged so that it produces an output signal here labeled $C<40$ only when the number contained in the counter 52 is less than forty.

Again, the details of such a decoder are well-known to those skilled in the art. It will suffice, therefore, to observe that with the foregoing assumption that each feedback pulse and each count in the counter represents .001", the decoder 71 will normally cause the signal $C<40$ to reside at a "0" level, but will cause that signal to change to a "1" level when the table 15 has been moved through a distance which is within .040" of the commanded displacement represented by the number originally read from the punch tape and shifted into the register-counter 52. Of course, the small predetermined error value of .040" is exemplary, and other values may be selected as a matter of choice.

*Creation of a zero count signal indicating zero error*

The register-counter 52 is also used as a part of an arrangement to produce a signal whenever the executed displacement of the tape 15 equals the commanded displacement. As here shown, a zero decoder 72 has its several input lines coupled to the stages of the counter 52, and this decoder functions to produce an output signal ZC only when the counter contains the number 00.000.

The zero decoder 72 may take any of a number of well-known forms, and its details will not here be described. It will be understood that the "zero count" signal ZC resides at a binary "1" or "0" level only when the number stored in the register-counter 52 is (a) zero, or (b) some value other than zero. Thus, the signal ZC will during execution of a commanded displacement change from "0" to "1" only when the distance moved by the table 15 exactly equals the originally commanded distance as a result of down counting by the counter 52 having reduced the counter contents to zero. The ZC signal is passed through an inverter 74 so that the output of the latter is a complement signal $\overline{ZC}$ which resides at a binary "1" level when the counter contains some number other than "0." The manner in which these signals ZC and $\overline{ZC}$ are utilized in the control of the positioning operations will become clear from subsequent portions of the present description.

*Creation of a slowdown signal in dependence upon both error distance and part velocity*

In accordance with an important feature of the present invention, means are provided to create a slowdown signal when the distance error has been reduced to a preselected first value which is not necessarily constant, but which is on the contrary a monotonic function of the velocity at which the movable part is then traveling. As will be explained more fully below, the creation of and the response to such a slowdown signal enables an engaged high speed clutch to be released and the brake to be applied at an instant when the error distance is a direct function of the velocity, so that the controlled part or table 15 is braked to a stop with the error distance reduced substantially to zero.

As shown in FIGS. 2a and 2b, the means for creating a slowdown signal SD includes a voltage comparator 75, a function generator 76, a bipolar circuit 77, and a tachometer generator 78. The tachometer generator is driven from the gear 66 so that its speed of rotation is directly proportional to the linear speed of the table 15. The tachometer generator may be, for example, a permanent magnet DC generator of conventional design which produces a DC voltage proportional in magnitude to the speed with which its rotor is driven. Because the polarity of the voltage produced by the tachometer generator will reverse when the direction of table motion is reversed, the bipolar circuit 77 is employed to convert the output voltage of the tachometer generator into a DC voltage which always has the same polarity regardless of the direction in which the table 15 is being driven.

Referring to FIG. 3, the tachometer generator 78 is there shown schematically in association with a more detailed schematic illustration of the bipolar circuit 77. In particular, the bipolar circuit is formed by a bridge similar to a full wave rectifier bridge constituted by four diodes 77a and having input terminals 77b connected directly to the output lines of the tachometer 78. Connected across the opposite terminals of the bridge is a potentiometer 79 having an adjustable wiper 79a. One end of the potentiometer 79 is connected to a point of reference potential here shown as ground, and the wiper 79a is connected to an output terminal 80, so that a voltage Vs appears with the indicated polarity between the terminal 80 and a grounded terminal 81. Irrespective of the direction in which the tachometer generator 78 is driven, and regardless of the polarity of the tachometer output voltage, the speed-representing voltage Vs will always have the same polarity. Because the output voltage of the tachometer 78 is proportional to the speed of the table 15, the voltage Vs is likewise so proportional, but the factor of proportionality may be adjusted by changing the setting of the wiper 79a.

The schematic circuit diagram for a suitable monotonic function generator 76 is shown in FIG. 4 wherein the input speed-representing voltage Vs is applied between the terminals 80 and 81, the latter being at ground potential. Since four sections of the circuitry shown in FIG. 4 are substantially identical, the first one will be described with reference characters having the suffiix a, and the corresponding parts of the remaining three sections will be designated by the same reference numerals but with distinguishing suffixes b, c, d.

In the first portion of the circuitry shown at the left of FIG. 4, a transistor 90a connected as emitter follower has the input voltage Vs applied across its base-emitter junction through an emitter load resistor 91a and a current limiting resistor 92a. The collector of this transistor is connected directly to a −12 volt source, so that normally the potential at the emitter terminal 94a will be substantially equal to the input voltage Vs.

A low impedance adjustable voltage source is created and utilized to clamp the response of the transistor 90a when the input voltage Vs exceeds a predetermined but adjustable magnitude. For this purpose, a second transistor 95a is connected in an emitter follower circuit with its collector tied directly to the −12 volt source and its emitter connected through a load resistor 96a to the ground terminal 81. A potentiometer 98a connected directly across the 12 volt source has its adjustable wiper 99a connected to the base of the transistor 95a, so that as that wiper is adjusted to make the voltage applied to the base more or less negative, the current flow through the load resistor 96a is increased or decreased, and the potential at the emitter terminal 100a becomes correspondingly more or less negative.

This emitter terminal 100a upon which an adjustable voltage appears is connected through a clamping diode 101a directly to the base of the emitter follower transistor 90a. Thus, current flow through the emitter-collector circuit of the transistor 90a will be substantially proportional to the magnitude of the input voltage Vs until the latter becomes more negative than the potential at the emitter terminal 100a. Further increases in the input voltage Vs can produce no further increases in current flow through the emitter follower transistor 90a, and thus the potential of the emitter terminal 94a cannot become more negative than the potential at the emitter terminal 100a. In this way, the response of the emitter follower 90a is clamped so that it cannot follow the negative input voltage Vs when the latter increases beyond a predetermined magnitude established by setting the potentiometer wiper 99a.

In order to provide an adjustable gain response to the limited variation signal which appears at the emitter terminal 94a, an amplifying transistor 102a has its base connected through a current limiting resistor 104a to the terminal 94a, and its emitter connected through a variable resistor or rheostat 105a to a point of reference potential, in this particular case the terminal 81 at ground potential. The collector of the transistor 102a is connected through a load resistor 106 (common to all four sections of the circuitry) to the −12 volt source. Thus, as the potential at the emitter terminal 94a becomes more or less negative, the current flow through the emitter-collector path of the transistor 102a will increase or decrease, and with a gain factor or slope which is determined by the adjusted value of the rheostat 105a.

It will be apparent that the emitter follower transistors 90b, 90c, 90d all have the input voltage Vs applied across their emitter-base junctions in the same way described above with reference to the transistor 90a. Thus, all of these four emitter follower transistors will respond to the same input voltage Vs, but the response of these four individual transistors will be limited at different magnitudes according to the settings of their associated potentiometer wipers 99a, 99b, 99c and 99d. Moreover, while the emitter of the amplifying transistor 102a is returned through the rheostat 105a to ground potential, the emitter of the transistor 102b is returned through its gain-control rheostat 105b to the adjustable clamp voltage established in the preceding section, i.e., to the emitter terminal 100a of the transistor 95a. Therefore, the amplifying transistor 102b is permanently cut off and cannot conduct until the potential at the emitter terminal 94b becomes more negative than the adjusted clamp voltage for the preceding section. Similarly, the amplifying transistor 102c cannot begin conduction until the potential at the emitter terminal 94c becomes more negative than the adjusted clamp potential established in preceding section at terminal 100b. Finally, the amplifying transistor 102d cannot begin conduction until the potential at the associated emitter terminal 94d becomes more negative than the adjusted clamp voltage established in the preceding section at the terminal 101c by the setting of the potentiometer wiper 99c.

For convenience of explanation, it may be assumed that the wipers 99a–d are adjusted such that the voltages at terminals 100a–d are of progressively greater negative values. Therefore, when the input voltage Vs has a first range of magnitudes, only the transistor 102a will respond thereto and produce a voltage drop across the common load resistor 106. As the input voltage Vs increases into a second range of magnitudes, the current flow through the transistor 102a remains constant due to the clamping action on the associated emitter follower 90a. But when this clamping action begins, the amplifying transistor 102b may begin to conduct and will contribute additional current flow through the common load resistor 106 as the input voltage Vs continues to increase in magnitude. When the clamping action on the emitter follower 90b results in limiting further increases of current flow through the amplifying transistor 102b, the amplifying transistor 102c begins to conduct and contribute further current flow through the common load resistor 106 as the input voltage Vs continues to increase. Finally, when, due to clamping action, the transistor 102c is prevented from increasing the current flow therethrough, the transistor 102d becomes effective and provides additional current flow through the common load resistor 106 as the voltage Vs further increases in magnitude.

The potential drop across the load resistor 106 is applied across the base-emitter junction of a final amplifying transistor 108 through a gain-adjusting rheostat 109. The emitter of the final amplifier 108 is thus returned to the −12 volt source, while its collector is connected through a load resistor 110 to an adjustable supply potential at the wiper 111 of a potentiometer 112 which is connected between ground and the −12 volt source. The greater the current flow through the load resistor 106, therefore, the greater is the base-emitter current of the transistor 108, and the greater the collector current passed through the resistor 110. The output voltage $f(Vs)$ appears between an output terminal 114 and the terminal 81 at ground potential. When the input voltage Vs is zero and no current flows through the load resistor 106, the base value of the output voltage is determined by the setting of the potentiometer wiper 111. This is indicated in FIG. 5.

The operation of the monotonic function generator shown in FIG. 4 may be better understood with reference to curve 83 in FIG. 5 which is based on the assumption that the potentiometer wiper 99a is adjusted to make the clamp potential at terminal 100a −2 volts; the potentiometer 99b is adjusted to make the clamp potential at terminal 100b −5 volts; the potentiometer wiper 99c is adjusted to make the potential at terminal 101c −7 volts; and the wiper 99d is adjusted to make the potential at terminal 101c −10 volts. It may be further assumed that the wiper 111 is adjusted to have a potential of −1 volt. Thus, when the input voltage Vs is zero, the output voltage $f(Vs)$ will be −1 volt, as shown in FIG. 5. As the input voltage Vs increases in magnitude from 0 to −2 volts, the amplifying transistor 102a increases in conduction with a gain determined by the setting of the rheostat 105a. Thus, the slope of the curve portion 83a is determined by the adjusted setting of the rheostat 105a. As the input voltage Vs increases beyond the −2 volt magnitude, the transistor 102a continues to conduct the same magnitude of current due to the clamping action of the diode 101a; but at the same time the amplifying transistor 102b begins conduction and therefore begins to contribute to the voltage drop across the common load resistor 106. Thus, as the input voltage Vs increases in magnitude from −2 to −5 volts, increased current flow through transistor 102b will cause the output voltage $f(Vs)$ to increase as illustrated by the curve portion 83b in FIG. 6, the gain or slope of this curve portion being selected by the adjustment of the rheostat 105b. It will be apparent that the point at which the conduction of the transistor 102a is clamped and the conduction of the transistor 102b begins is determined by the selected adjustment of the potentiometer wiper 99a and the corresponding value (here shown as −2 volts) of the clamping potential at terminal 100a.

As the input voltage Vs increases in magnitude above −5 volts and toward −7 volts, increased conduction by the transistor 102b is prevented by the −5 volt clamping potential applied through the diode 101b through the base of the transistor 90b. Concurrently, however, as the input voltage increases in magnitude above −5 volts, the transistor 102c begins conducting and contributes current through the common load resistor 106 with a gain determined by the selected setting of its associated rheostat 105c. Thus, the slope of the curve portion 83c is established by the rheostat 105c and the input voltage magnitude at which that curve portion begins is determined by the clamping voltage selected by adjustment of the potentiometer wiper 99d.

Finally, as the input voltage Vs increases in magnitude above −7 volts, further conduction by the transistor 102c is prevented due to the clamping action of the diode 101c which receives a −7 volt clamping potential; and concurrently the transistor 102d begins to conduct current which progressively increases as the input voltage increases in magnitude toward −10 volts. Thus the slope of curve section 83d is determined by the adjustment of the rheostat 105d and the value of input voltage Vs at which this curved section begins is established by the clamp voltage determined by the setting of the potentiometer wiper 99c.

In review, the function generator 76 illustrated in FIGS. 2a and 4 receives a speed-representing input signal Vs and produces an output signal $f(Vs)$ which increases as a monotonic function of the input. In the present instance, this is an arbitrary continuously increasing function which can be readily shaped or adjusted to have successive sections of different slopes and lengths simply by adjusting the potentiometers and rheostats in the circuitry illustrated by FIG. 4. As will be explained more fully below, this permits the positioning control system to be matched to a particular deceleration characteristic of the brake which is used to stop the movable part being controlled, and also to be matched to the inertia characteristics of the part being moved.

As stated earlier, the output voltage $f(Vs)$ by its magnitude represents a monotonic function of the velocity with which the control part or table 15 is traveling. By selection of the number of sections in the monotonic function (more than the four circuit portions shown by way of example in FIG. 4 may be employed), and the starting level and slope of each such section, the function voltage $f(Vs)$ may be made to indicate by its magnitude the distance which the movable part or table 15 will travel before stopping in response to engagement of the brake BR. This is not usually, but it may be, a strictly linear relationship. More often it will be found to be a monotonic function in the sense that the distance traveled before stopping after engagement of the brake increases with part velocity, but at different slopes over different portions of the velocity range. Thus, for any system the characteristics of the brake and the inertia of the part which result in different extents of travel to stop the part from different velocities may be determined, and the monotonic function generator here described will, after adjustment, make the voltage $f(Vs)$ substantially proportional to the distance traveled while the brake is stopping the part from any velocity. The output voltage Ve of the digital-to-analog converter, on the other hand, by its magnitude represents the instantaneous value of the distance error. The two voltages Ve and $f(Vs)$ are applied as inputs to the voltage comparator 75 which functions to produce at its output a slowdown signal SD only when the speed function voltage $f(Vs)$ is greater than the error representing voltage Ve. Thus, the slowdown signal SD appears when the table 15 is displaced from its final stopping position by an amount which is greater if the table is traveling at higher velocities and which is smaller when the table is traveling at lower velocities. The manner in which the slowdown signal SD is utilized will be treated in detail below.

*Creation of a zero speed signal*

For a purpose which will be made clear below, means are included in the present system for producing a signal indicative of the fact that the movable part has zero velocity, i.e., is at rest. In the present instance, such a zero velocity signal ZS is created by supplying the speed-representing voltage Vs as one input to a second voltage comparator 120 which receives as its second input signal zero volts, i.e., ground potential. This voltage comparator 120 may be of conventional, well-known form and it will suffice to note only that it produces at its output the zero speed signal ZS which becomes a "1" only when the speed-representing voltage Vs falls to zero. The purpose of this zero speed signal will become clear from the subsequent description of the operation of the system as a whole.

The organization and operation of the composite system

The various control signals which are created in the ways described above are utilized to control the engagement of the forward and reverse clutches FC and RC, as well as the engagement of the brake BR and the actuation of the step motor 45. For this purpose, bi-state devices such as flip-flops FF1, FF2, FF3 shown in FIG. 2b are associated with AND and OR logic devices, all of these being arranged in a manner such that in response to a disance command, the controlled part or table is driven at a high speed for substantially the maximum possible time in order to execute the command, then braked to a stop with a zero or small error, and, if necessary, subsequently moved slowly until the command is fully and precisely executed.

The organization and operation of the logic circuitry and controls may best be described by a narrative sequence of the events which occur during the execution of a given positioning operation. Accordingly, the operation of the control system under normal circumstances will first be described, and special cases will then be treated separately.

Operation—Case I

Let it be assumed that the drill head 25 (FIG. 1) is fully raised and at rest so that the "drill retracted" signal DR is supplied as one input to the AND circuit 60 (FIG. 2a). As initial conditions, it may also be assumed that the register-counter holds a zero count and thus that the zero count signal ZC is a binary "1" (and the signal $\overline{ZC}$ is a binary "0"), and that the C<40 signal is also a binary "1." Because the movable table 15 is at rest, the speed-representing voltage Vs is zero and the zero speed signal ZS is at a binary "1" level. Further, it may be assumed that all of the main control flip-flops FF1–3 are in their reset states, so that their "true" output signals RUN, HI and DEC are all at a binary "0" level, and their "complement" output signals STOP, LO and $\overline{DEC}$ are at binary "1" levels. Under these conditions, it will be apparent that the STOP signal applied as one input to an OR circuit 130 causes the latter to produce an EB signal which activates the brake driver 44 to energize the brake solenoid BS, so that the brake BR is initially engaged.

The operation of the system proceeds in the following way:

(1) If now the operator of the drilling machine momentarily depresses an "operator start" switch OS, the signal created by the latter will be transmitted through an OR circuit 131 as a START signal for the tape reader 51. The reader will begin transporting the tape therethrough and producing output signals corresponding to the characters or numerals represented by the successive rows of coded information. When an X address is read from the punched tape, an X code output signal from the decoder will reset the address flip-flop FFa thereby opening the gates 56 and 58. When the next row on the punched tape representing the direction of the commanded X displacement is read, an output signal will appear on the + or − terminal of the decoder 55. Assuming that the X command is positive, that output signal +X will be transmitted through the gates 56 to set the direction flip-flop FFd so that the signal D+ will be switched to (or left in) a binary "1" level and the signal D− will be switched to (or left in) the binary "0" level. The existence of a D+ signal, as will subsequently appear, will cause the movable table 15 to be driven in a positive direction (to the right). The sign signal +X (or −X) will also be routed to one input of an OR circuit 171 (or OR circuit 170), and thus will set (or reset) a control flip-flop FFe. This latter flip-flop will thus be initially set or reset if the sign of the commanded displacement is positive or negative, and it serves a purpose explained hereinafter.

(2) After the sign of the commanded X axis displacement has been read, the successive digits of the X command number will be successively signaled on the decoder output line 59 in binary coded notation, transferred through the gates 58 and shifted into the register-counter 52. As the number in the counter 52 increases from zero, the zero count signal ZC will revert to a "0" and, if the number held in counter 52 increases to 40 or above, the C<40 signal will also switch to a binary "0" level. It will be assumed for the moment that this latter condition obtains.

(3) When the last row of a given block on the punched tape is read, an output signal will appear on the EOB terminal of the decoder 55 and this will be applied to the HOLD terminal of the tape reader 51 causing the latter to cease its reading operations. Because the DR and EOB signals now simultaneously exist, the AND circuit 60 produces a "1" output signal which is converted by the differentiating circuit 61 into a momentary execute signal EX. As noted previously, the EX signal is transmitted to the reset terminal of the count control flip-flop FFc, thereby energizing the count down control terminal CD so that the register-counter will thereafter count down in response to feedback pulses applied to its input terminal I.

(4) The EX signal is also applied to one input of an AND circuit 135, and because the other input signal $\overline{ZC}$ applied thereto is now a "1," the resulting response of that AND circuit will set the flip-flop FF1, making the RUN signal "1" and the stop signal "0." As a result, the EB signal from the OR circuit 130 reverts to a "0" level and the brake BR is released. Moreover, because the C<40 signal applied to the input of an inverter 136 is now a binary "0," the output signal C>40 produced by the latter is a binary "1"; and, because the RUN signal is a "1," an AND circuit 138 switches its output from a "0" to a "1" level thereby setting the flip-flop FF2 and switching the signal HI from a "0" to a "1" level. Thus, RUN=1, STOP=0, HI=1, LO=0.

(5) Although an AND gate 139 is disabled at this time because the D− signal is a zero, and thus the clutch driver 41 is prevented from energizing the reverse clutch solenoid RS, an AND gate 140 is fully qualified because its four input signals D+, HI, RUN, $\overline{DEC}$ are all at a binary "1" level. The "engage forward clutch" signal EFC therefore activates the clutch driver 40, the solenoid FS is energized, the forward clutch FC is engaged, and the table 15 is rapidly accelerated to and driven at a high speed in a positive direction from the continuously running induction motor 30.

(6) Of course, as the table 15 begins to move, the pulse generator 65 begins generating feedback pulses for each increment of motion. As described earlier, the two phase pulses appearing on the generator output line 65a, 65b are converted by the direction logic circuitry 68 into a train of pulses on the +P output line, and these pulses are transmitted through the OR circuit 69 to the counter input terminal I so that the later begins to count downwardly. Moreover, as the table 15 is accelerated and then driven at a substantially constant high speed, the output voltage from the tachometer generator 78 will increase, and the speed-representing voltage Vs from the bipolar circuit 77 will increase to be proportional to the table speed. This acceleration of the table 15 upon engagement of the clutch FC is illustrated by a portion 140a of the curve 140 in FIG. 6, and the constant high velocity of the table after such acceleration is represented by the curve portion 140b.

(7) As the table continues to move and the number held in the register-counter 52 progressively decreases due to the count down operation, the error-representing voltage Ve will progressively decrease. When the voltage Ve becomes less than the voltage $f(Vs)$ (thus indicating that the error distance has been reduced to a value equal to the distance which the table 15 will travel before stopping if the brake BR is applied at that instant), the voltage comparator 75 will produce a slowdown signal SD which is routed through an OR circuit 141 to one input of an AND gate 142 whose other input signal HI is at this time a binary "1." Accordingly, the flip-flop FF3 will be set to its "1" state, switching the DEC and $\overline{DEC}$ signals respectively to "1" and "0" levels. As a result, the gate 140 disqualified, the EFC signal disappears and the forward clutch FC is released. Further, because the DEC and HI signals are now both "1's," an AND gate 144 supplies an output signal to one input of the OR circuit 130, so that the EB signal is reestablished and the brake BR is engaged. It will, therefore, be apparent that the present system provides a means to release the engaged clutch and engage a brake so as to rapidly decelerate the controlled part when the slowdown signal SD appears.

(8) As soon as the brake is thus engaged, the retarding torque which it creates causes deceleration of the table 15, as illustrated by the curve portion 140c in FIG. 6. The table is stopped very quickly, and the deceleration period has been exaggerated in FIG. 6 merely to facilitate the present explanation. By appropriate adjustment of the variable rheostats and potentiometers in the function generator 76, the slowdown signal is made to appear at an instant when the error distance has a value which causes the brake to bring the table 16 to a complete stop with almost exactly the commanded displacement. This condition is illustrated in FIG. 6 where the velocity of the table is reduced to zero at the instant the table reaches the command distance point 140d.

(9) Of course, while the table is slowing down and approaching the stopping point 140d, the error distance will become less than .040" and the proximity signal $C<40$ will switch to a binary "1" level. This, by itself, will produce no effect on the control system. Then, when the part stops after having moved precisely the command distance, the speed signal Vs will become zero and the zero speed signal ZS will change to a "1" value simultaneously will the zero count signal ZC switching to a binary "1" level. The zero speed signal ZS thus passes through an OR circuit 145 and resets the flip-flop FF3. The ZS and $C<40$ signals now both being "1's," an AND gate 146 is qualified and its response resets the flip-flop FF2, switching the signal HI to "0" (so that the gates 139 and 140 are both disqualified and neither clutch FC or RC can be engaged), and switching the LO signal to "1." With the latter, an AND gate 148 is qualified because its two input signals ZC and LO are both "1's," so that the flip-flop FF1 is reset to its "0" state, making the signals RUN and STOP respectively "0" and "1." Because the STOP signal is "1," the OR circuit 130 produces an EB signal, and the brake BR is reengaged to lock the table 15 in its stopped position.

(10) Thus, with the operation as described with reference to FIG. 6, the table will be moved precisely through its commanded displacement simply by engagement of a high speed drive clutch, and a properly timed release of that clutch accompanied by engagement of the brake. When the commanded movement is thus precisely completed and the signal STOP is restored to a "1" level, it is supplied as one input to an AND circuit 150 which receives as its other input a similar STOP signal from the Y axis control system (not shown). As a result, when the commanded displacements along both the X and Y axes have been precisely executed, the gate 150 will produce an output signal which will be transmitted through the OR circuit 131 to the START terminal of the tape reader 51, thereby causing the latter to resume operation and read another block of command information. The cycle described may therefore be repeated again.

*Operation—Case II*

The optimized operation described above as Case I with reference to FIG. 6 will very probably not be consistently obtained. For one thing, it is difficult to adjust the function generator 76 so that the table is braked to a stop exactly within less than .001" of the total commanded displacement. Even then, the torque characteristics of the brake BR may change over a period of time due to such uncontrollable variables such as wear, temperature, humidity, and spurious deposits of dirt between the friction surfaces of the brake. Further, different workpieces of significantly different weights when mounted on the table 15 may so change the effective mass of the latter that even with constant braking characteristics and an initially perfect adjustment of the function generator 76, the table may tend, because of different effective inertias, to undershoot or overshoot the point at which the commanded displacement is precisely executed.

Despite these factors, the present system functions to move the table 15 by high speed drive through one of the clutches FC or RC, to brake the table to a stop in very close proximity to the commanded displacement, and then to move it through the remaining short distance at a slow velocity.

The velocity-displacement curve 155 (FIG. 7) illustrates what may be called Case II operation during which such a sequence occurs. This involves:

(1) Information from one block of the punched tape 50 is read, and the forward clutch FC is engaged to accelerate and drive the table 15 in the same manner as described in Case I, paragraphs 1 to 6, supra. This is illustrated by curve portions 155a and 155b in FIG. 7.

(2) When the slowdown signal SD appears, the clutch FC is released, and the brake BR is engaged so that the table is decelerated (curve portion 155c) in the same manner described in Case I, paragraph 7, supra. While the part is decelerating, the various control signals are at the following binary levels: RUN=1, HI=1, DEC=1, EB=1, $C<40$=0, ZC=0, and ZS=0.

(3) During the time that the table is decelerating, but while it still has finite speed, it comes to within .040" of completing the commanded distance, and the signal $C<40$ switches to a binary "1" level. This by itself produces no direct effect on the control system.

(4) The brake BR then brings the table 15 to a complete stop as indicated at 155d in FIG. 7, with the executed displacement being less than the total commanded displacement but being within predetermined small distance or proximity of .040". That is, the number then remaining in the register-counter 52 is less than forty but greater than zero. When the table thus stops, the zero speed signal ZS switches to a binary "1" level.

(5) When the zero speed signal ZS becomes a "1," it is transferred through the OR circuit 145 and resets the flip-flop FF3 so that the signal DEC is returned to a binary "0," the gate 144 is disabled, and the brake BR is released.

(6) Because the signals ZS and $C<40$ are now both "1's" the gate 146 produces an output signal which resets the flip-flop FF2. Accordingly, the signal HI reverts to a binary "0" level and prevents qualification of the gates 139 and 140 so that neither of the clutches FC or RC can be engaged. Also, the signal LO switches to a binary "1," so that the three signals LO, $\overline{ZC}$, RUN applied to an AND gate 156 cause the latter to produce an output signal ESM which activates pulse driver 49. Because the direction signal D+ is a binary "1," the pulse driver renders the step motor effective to drive the table at a relatively low velocity and in a positive direction. This low velocity stepping movement of the table is represented by curve portion 155e in FIG. 7.

(7) As the table is stepped slowly in a direction to complete the commanded displacement, feedback pulses continue to reduce the number held in the register-counter 52. When the commanded displacement is precisely completed, the number in the counter is reduced to zero so that the signals $\overline{ZC}$ and ZC respectively become "1" and "0."

(8) When the signal $\overline{ZC}$ switches to a "0" level, the gate 156 is disabled, the signal ESM disappears, and the step motor 45 is deenergized. Thus, the table 15 comes to a final stop precisely at the commanded displacement point represented at 155*f* in FIG. 7.

(9) When the commanded displacement is completed and the zero count signal ZC becomes a binary "1," the signal LO is already at a binary "1" level. Accordingly, the gate 148 produces an output which resets the flip-flop FF1, making the signal RUN a binary "0" and the signal STOP a binary "1." Thus, the STOP signal is transferred through the OR circuit 130 to create the signal EB, and the brake BR is reengaged to lock the table at its new position.

(10) Moreover, when the table 15 stops a second time, the zero speed signal ZS again becomes binary "1." This supplies resetting signals to the flip-flops FF2 and FF3, but the latter already reside in their reset states so that the condition of the control apparatus is not changed.

(11) Finally, when the STOP signal changes to a binary "1" level at the conclusion of the positioning operation, it enables the gate 150, and if a similar signal is received from the Y axis controls, the tape reader 51 will be restarted as previously described.

It will be apparent from the foregoing description that the present control system functions to disengage a high speed clutch and engage a brake to decelerate the movable part or table when the slowdown signal SD appears. The function generator 76 serves to make the slowdown signal appear when the error distance, with reference to the table velocity, has values such that the brake will stop the table almost precisely with the commanded displacement. However, if for any reason the brake does not stop the table with exactly the commanded displacement, but the error distance is less than a predetermined small value (here .040"), then the step motor 45 will be energized to move the table at a low velocity and in the proper direction until the commanded displacement is fully and precisely executed. The use of the slow speed stepping motor called into operation when the error distance after initial stopping is less than .040" assures that the table 15 will be stopped precisely without overshoot or undershoot; yet, because the step motor is never rendered effective unless the error distance is less than .040" (as hereinafter observed) the step motor need not operate for any appreciable length of time during any given positioning cycle.

*Operation—Case III*

It is conceivable that the characteristics of the brake BR and the effective mass or inertia of the table 15 may so change that the brake when engaged will bring the table to a stop with the error distance greater than the predetermined small value of .040". This situation will here be termed Case III, and the operation of the control system under these conditions will be described with reference to the velocity-position curve 158 in FIG. 8.

When a given block is read from the punched tape 50, the system may function to accelerate and then drive the table at a high speed through the clutch FC as represented by curve portions 158*a* and 158*b*; and when the slowdown signal SD appears, the clutch will be released, and the brake BR will be engaged so that the table is decelerated as indicated by curve portion 158*c*. The operation of the system to produce these sequences will be the same as described above, and the curve portions 158*a–c* represent operations similar to those illustrated by curve portions 140*a–c* in FIG. 6. For purposes of narrating Case III operation, however, it is assumed that the engaged brake brings the table to a stop at point 158*d* (FIG. 8) and that when this occurs the error distance is still greater than .040". Thus, when the table comes to an initial stop, the signal $C<40$ is still at a binary "0" level. As a result, the system functions in the following way:

(1) When the table comes to a stop at the point 158*d*, the zero speed signal ZS appears, and passes through the OR circuit 145 to reset the flip-flop FF3. The signal DEC reverts to a "0," and thus the brake BR is disengaged. Also, the signal $\overline{DEC}$ switches to a binary "1" level.

(2) When the signal $\overline{DEC}$ becomes a binary "1," the signal HI is still at a binary "1" level because flip-flop FF2 has not been reset since the signal $C<40$ is still "0" and the gate 146 cannot produce an output to reset the flip-flop FF2 even though the signal ZS has changed to a binary "1" level. Therefore, the three signals HI, RUN and $\overline{DEC}$ are all at this time at a binary "1" level. And, assuming that the direction signal D+ is a binary "1" the gate 140 will be fully qualified to produce the EFC signal, thereby causing the clutch driver 140 to engage the forward clutch FC. Thus, the table is again accelerated by the drive from the induction motor 30, and this is illustrated by curve portion 158*e* in FIG. 8.

(3) As the speed of the table increases, the speed voltage Vs will correspondingly increase, and the voltage $f(Vs)$ will increase as a monotonic function of the latter. Because the error distance is now fairly small, the error voltage Ve will very quickly be exceeded by the function voltage $f(Vs)$ and the slowdown signal SD will be created for a second time. This is illustrated at point 158*f* in FIG. 8.

(4) This slow down signal SD will be transferred through the OR circuit 141, and because the HI signal is still at a binary "1" level, the gate 142 will produce a response to set the flip-flop FF3. As a result, the $\overline{DEC}$ signal will revert to "0," thereby disqualifying the gate 140 and causing release of the clutch FC. At the same time, the signal DEC will switch to a binary "1" level, thereby qualifying the gate 144 so that the brake BR is engaged. The table now is decelerated by braking action as indicated at 158*g* in FIG. 8, until it comes to a stop at point 158*h*. By the time the point 158*h* is reached, the error distance is less than .040," and so the brake BR is released, the step motor 45 is rendered effective, and operation proceeds as described for Case II, paragraphs 5 to 11, supra. Thus, the table is now stepped slowly as indicated at 158*i* until it has precisely executed the commanded diseplacement, the operation being substantially the same as described above under Case II.

It will be understood, from the illustration and description of Case III operation, that if the brake should bring the table to a halt before the error distance is reduced to a predetermined small value (here .040"), then slow speed drive from the stepping motor 45 is not immediately employed because the translation of the table through a relatively great distance at the slow stepping speed would be unduly time-consuming. Rather, high speed drive of the table is resumed by releasing the brake and reengaging the clutch until the slowdown signal appears a second time, and the braking operation will result in the stopping of the table with the error distance very small, and in any event less than the predetermined value of 0.40." If this second stopping of the part by the brake does not reduce the error distance precisely to zero, then the stepping motor is called into operation, but it need only move the table through a relatively short distance until the commanded displacement is completed.

The curve portions 158*e* and 158*g* in FIG. 8 illustrate one of the most important functions provided by the function generator 76 (FIG. 2*a*) and the slowdown signal SD which appears when the error distance is reduced to a value equalling the distance which the table 15 will travel if the brake is applied while the table has any particular velocity. Although the acceleration of the table 15 is very rapid, a finite time (exaggerated in FIG. 8) is required after excitation of the clutch coil FS for the friction clutch FC to bring the table up to the maximum high speed. Yet, during this time the table will be moving. If the remaining distance to the final stopping point is very short (for example, less than .400"), then it is necessary to disengage the clutch and apply the brake before the part reaches full speed. The means here described for producing the slowdown signal SD, and the apparatus which responds to that signal, terminate the clutch drive and engage the brake the instant when the instantaneous error distance and table velocity are so related that the brake will stop the table almost perfectly in the desired final position. Of course, this same operation to release the clutch and apply the brake before the part reaches maximum velocity may take place prior to the initial stopping, as well as subsequent thereto, the latter being illustrated in FIG. 8.

*Operation—Case IV*

It may happen that certain blocks of command data on the punched tape 50 call for displacement of the table 15 through very small distances which are less than the predetermined small error distance which has here been described by way of example as .040". When the table is to be moved through such a very short commanded displacement, it is undesirable to bring the high speed clutch drive into operation, since overshoot or undershoot is more likely to occur and, in any event, execution of a commanded displacement of less than .040" will require only a short period of time even if it is carried out by drive from the slow speed step motor 45. Case IV operation is here considered as that which occurs when the commanded X axis displacement is less than the predetermined small distance .040," and this is illustrated by the velocity-distance curve 160 in FIG. 9.

Briefly stated, Case IV proceeds in response to starting of the tape reader as described above in paragraphs 1 and 2 for Case I operation. However, when the execute signal EX appears, the number previously shifted into and stored by the register-counter 52 is less than forty and the signal C<40 is at a binary "1" level. Accordingly, the operation proceeds as follows:

(1) When the execute signal EX appears and the $\overline{ZC}$ signal is at a binary "1" level, the gate 135 produces an output signal which sets the flip-flop FF1, thereby setting the signal RUN to "1" and the signal STOP to "0."

(2) Because the signal STOP is switched to a binary "0," the signal EB disappears, and the brake BR is released.

(3) When the signal RUN switches to a binary "1" level, the other input C≥40 to the gate 138 it at a binary "0" level because the count held in the counter is less than 40 and the input signal C<40 to the inverter 136 is at a binary "1" level. Thus, the flip-flop FF2 is not set, so that the signal HI remains at a binary "0" level, and the signal LO remains at a binary "1" level.

(4) Inasmuch as the signal HI is a binary "0," neither of the gates 139 or 140 is qualified, and thus neither of the clutches FC or RC can be engaged.

(5) On the other hand, because the signal LO remains at a binary "1" value, and because the signals $\overline{ZC}$ and RUN are both binary "1's," the gate 156 produces an output signal ESM, and the pulse driver 49 energizes the step motor 45 to drive the table 15 at a slow speed in a positive direction under the control of the direction signal D+. Thus, as shown in FIG. 9, the system operates simply to drive the table 15 from its original position at a slow stepping velocity represented by the curve portion 160a.

(6) Of course, during this slow speed drive of the table, feedback pulses supplied to the register-counter 52 reduce the number stored therein, and when the number is reduced to zero, then movement of the table is terminated in the same sequence of operations described for Case II, paragraphs 7 to 11, supra.

It will therefore be apparent that the present system utilizes a slow speed execution of a commanded displacement which is so small that the high speed drive from the clutches is not necessary, and which thus will not be significantly time-consuming.

*Operation—Case Va*

In Case II and Case III illustrated by FIGS. 7 and 8, respectively, the engagement of the brake BR brings the table 15 to an initial stop before the latter has been moved through the total commanded displacement. It is possible that, due to extreme wear or variations in other factors such as temperature, humidity, or dirt deposits, the torque exerted by the brake will be reduced, and the table 15 after being driven at a high speed through one of the clutches will not come to a stop until it has exceeded the commanded displacement. This may be called "overshooting" the desired final stopping point. Even if this should happen, the present control system functions to restore the table precisely to the commanded displacement. Such operation is here designated Case Va, and it is illustrated by the velocity-displacement curve 165 in FIG. 10.

Case Va operation involving overshoot and return may be briefly summarized as follows:

(1) In response to the reading of a block of data from the punched tape 50, the system will function to accelerate the table (curve portion 165a FIG. 10), to drive the table at high speed (curve portion 165b) and then to apply the brake BR so that the table is decelerated (curve portion 165c). The sequence of events which results in these initial portions of a positioning cycle are effected in the same manner as described above by Case I, paragraphs 1 to 6. While the table is being decelerated, the various control signals will have the following binary values: RUN=1, HI=1, DEC=1, EB=1, ZC=0, and C<40=1.

(2) It may be assumed, as shown in FIG. 10, that the table continues to move and to decelerate as it passes through the commanded distance position. As it passes through that posiiton, the count in the counter 52 will be reduced momentarily to 0, so that the signal ZC and $\overline{ZC}$ will momentarily exist at binary "1" and "0" levels, respectively (although the signal ZS will be "0").

(3) In response to such momentary signaling, the ZC and HI signals are both momentarily "1," so an AND gate 168 (FIG. 2b) produces a response which is supplied to the "toggle" input terminal of the flip-flop FFd, thereby switching or reversing its state. It has been previously assumed for purposes of discussion that the flip-flop FFd was initially set to its "1" state, and that the direction signal D+ was at a binary "1" level. Thus, the toggling of the flip-flop FFd by the output from the gate 168 will reset the latter, thereby making the direction signal D— change to a binary "1," and the signal D+ change to a binary "0." The system is therefore conditioned to drive the table in a direction opposite to that of its original movement when the table passes through the commanded distance point (zero count in the counter) while the signal HI is at a binary "1" level.

(5) Thus, as the table is being braked and passed through the commanded displacement point, the brake BR remains engaged, and only the direction flip-flop FFd is switched in state.

(6) There is, however, one further response to the ZC signal switching momentarily to a "1" level. As shown in the left portion of FIG. 2a, the ZC signal passes through an OR circuit 169 to the toggle input terminal T of the count control flip-flop FFc, thereby switching the state of the latter. Since the flip-flop FFc was previously in its reset state, the ZC signal changes it to a set state, thereby applying an enabling control signal to the terminal CU of the counter 52 and removing the control signal from the terminal CD. Thus, the counter is now conditioned to count upwardly in response to feedback pulses which appear on its input terminal I. Therefore, as the table 15 passes through the commanded distance point, and the pulse generator 65 continues to create feedback pulses, the counter begins to count upwardly and the number which is held therein represents the distance by which the table has overshot the desired stopping point.

(7) Of course, as soon as the table moves beyond the desired stopping point (as indicated by curve portion 165d in FIG. 10), the ZC signal reverts to a "0" level and the $\overline{ZC}$ signal is restored to a "1" level. This by itself produces no direct result.

(8) It is assumed, as illustrated in FIG. 10, that the continued engagement of the brake BR brings the table to an initial stop at point 165e which is beyond the commanded distance by an amount less than the predetermined proximity value of .040". Thus, when the table is stopped by the brake, the signal $C<40$ remains at a binary "1" value.

(9) When the table is completely stopped by the brake at the point 165e (FIG. 10), the zero speed signal ZS changes to binary "1" value. This signal is passed through the OR circuit 145 to reset the flip-flop FF3, causing the signal DEC to become "0," and thereby releasing the brake BR.

(10) Also, when the ZS signal becomes "1" and, as assumed, the $C<40$ signal is a "1," the gate 146 produces an output signal which resets the flip-flop FF2. Thus, the signal HI is placed at a binary "0" level and this prevents any response from the gates 139 or 140, thereby precluding engagement of either of the clutches FC or RC. At the same time, the signal LO is switched to binary "1" value, so that three signals LO, $\overline{ZC}$, and RUN applied to the gate 156 cause the latter to produce an ESM signal, thereby making the pulse driver 49 energize the step motor 45. However, at this time the D+ signal is a binary "0" and the D— signal is a binary "1," because the flip-flop FFd has been toggled to its reset state in the manner described above. Thus, the pulse driver 49 functions to make the step motor 45 drive the table 15 in a negative direction, so that the table begins stepping to the left at a slow speed toward the commanded distanced point, as illustrated by curve portion 165f.

(11) At the instant that the table 15 begins moving in a negative direction, the relative phase of the pulses on the two output lines 65a, 65b of the feedback pulse generator reverses, so that feedback pulses now appear on the —P output line of the direction logic circuitry 68, rather than on the +P output line. The feedback pulses continue to pass through the OR circuit 69 to the counter input terminal I, but the appearance of the first such pulse on the —P output line passes through the OR circuit 170 to reset the flip-flop FFe. It will be recalled here that the flip-flop FFe previously resided in the "1" state because it has been assumed the commanded displacement read from the tape was positive, and when the displacement sign was indicated by a +X signal, the latter passed through the OR circuit 171 to the set terminal of the flip-flop FFe. By this arrangement, the state of the flip-flop FFe is switched whenever the table 15 reverses the direction of its motion. In response to any reversal in the state of the flip-flop FFe, an OR circuit 172 produces an output pulse on a conductor 174, and this pulse is passed through the OR circuit 169 to the toggle input of the flip-flop FFc. Thus, the flip-flop FFc is switched from its "1" to its "0" state, removing the signal from the control terminal CU and reappplying a control signal to the terminal CD. Therefore, the counter 52 is again conditioned to count down in response to feedback pulses applied to its input terminal I.

(12) As the table 15 is stepped in a negative direction by drive from the step motor 45 (as indicated by curve portion 165f in FIG. 10), the count in the counter 52 is thus progressively reduced. At the beginning of such negative motion of the table, the count held in the counter represented the error distance. When the table is thus returned precisely to the commanded distance location, the count in the counter 52 is reduced to zero, and the signal ZC changes to a binary "1" value. In consequence, the gate 148 produces an output signal which resets the flip-flop FF1, thereby making the signal RUN "0," so that the gate 156 is disabled and the stepping motor 45 is deenergized. The table 15 is thus stopped precisely with the commanded displacement. The next cycle of the operation may then begin in the manner described above.

From the foregoing description, it will now be apparent that the present control system will return the movable part or table 15 precisely to the commanded displacement point even if the brake should initially stop the part after it has overtraveled beyond the desired final stopping point. If that overshoot is less than predetermined small value, then the return motion of the table will be carried out at a relatively low velocity by drive from the step motor 45, the direction of such drive being correctly established by reversing the direction control signals D+ and D— when the table initially passes through the desired stopping point.

Operation—Case Vb

It is conceivable that under certain conditions the analog circuitry employed to create the slowdown signal SD will fail to operate, either due to complete failure of circuit components or due to erratic operation at low signal levels when the table velocity is relatively low immediately after engagement of the clutch FC. In the event that the table should be driven through the desired stopping point with the high speed clutch still engaged, then it is necessary immediately to brake the table to a stop and bring it back to the desired final stopping point. As hereinafter described, this is accomplished by automatically releasing the engaged clutch and engaging the brake when the table passes through the zero error position even though no slowdown signal has been received.

Such operation is here designated Case Vb, and it is illustrated by the velocity-displacement curve 175 in FIG. 11. The sequence of operations under the conditions of Case Vb may be briefly described as follows:

(1) It may be assumed that in response to data read from one block of the punched tape 50 the clutch FC has been engaged and the table 15 is being driven at a high velocity in a positive direction. This condition is represented by curve portion 175a in FIG. 10.

(2) Assume now that for some reason no slowdown signal SD appears before the table 15 travels through the commanded distance. Thus, the table is being driven at a high velocity by the engaged clutch FC when it reaches the commanded displacement and the count in the counter 52 is reduced to zero. When this occurs, the zero count signal ZC will momentarily change to a binary "1" value.

(3) When the signal ZC momentarily becomes "1," then the gate 168 will produce an output to switch the state of the flip-flop FFd as previously described. The D+ and D— signals will thus be switched to "0" and "1" values. Moreover, the ZC signal will pass through the OR circuit 169 to switch the state of the count control flip-flop FFc thereby conditioning the register-counter 52 to count upwardly, as previously described. As the table continues to move to the right beyond the desired stopping point, the counter will count upwardly and its stored number will dynamically represent the displacement of the table from the desired stopping point.

(4) Finally, when the ZC signal is momentarily at a "1" level, and because the signal HI is at a "1" level, the OR circuit 141 and the associated gate 142 will produce a response which switches the flip-flop FF3 to its "1" state. As a result, the signal $\overline{DEC}$ is changed to a binary "0" level thereby terminating the output EFC from the gate 140 and disengaging the clutch FC. Simultaneously, the signal DEC is changed to a "1" level so that the gate 144 is qualified and its output causes the OR circuit 131 to create an EB signal which effects engagement of the brake BR. Thus, as the table passes the desired stopping point, the engaged clutch is released, and the brake is engaged so that the table begins decelerating as indicated by curve portion 175b in FIG. 11.

(5) Of course, an instant after the table passes through the desired stopping point, the signals ZC and $\overline{ZC}$ revert respectively to "0" and "1" levels, but this produces no direct effect.

(6) It may be assumed as illustrated in FIG. 11, that after the brake BR is engaged, the table does not come to an initial stop until it reaches a point 175c which is displaced from the commanded stopping point by more than the predetermined small proximity distance, here assumed to be .040". Thus, by the time the table is brought to an initial stop at point 175c, the proximity signal $C<40$ is at a binary "0" level.

(7) When the table stops after overshooting to the point 175c, the zero speed signal ZS will change to a binary "1" level. Because the signal $C<40$ is binary "0" level, the gate 146 produces no response, so the flip-flop FF2 is not reset and the signal HI stays at its binary "1" level. However, the ZS signal is transmitted through the OR circuit 145 and thus resets the flip-flop FF3. This causes the signal DEC to change to a binary "0" value so that the brake BR is released; and simultaneously the signal $\overline{DEC}$ switches to a binary "1" level. Because the direction signal D— is now a binary "1," the gate 139 is fully qualified and it produces an ERC signal which activates the clutch driver 41 so that the reverse clutch RC is engaged. In consequence, the table is accelerated in a negative or leftward direction as represented by curve portion 175d in FIG. 11.

(8) Conceivably the reverse clutch RC could become fully engaged and thus drive the table at the maximum high velocity in a negative direction. However, it is assumed here (and illustrated in FIG. 11) that the error distance is sufficiently reduced before the reverse clutch becomes fully engaged that the slowdown signal SD is produced by the voltage comparator 75 before the table reaches its maximum reverse velocity.

(9) When the slowdown signal SD appears, it passes through the OR circuit 141 and the enabled gate 142 (the signal HI is now a binary "1"), thereby setting the flip-flop FF3 so that the signal $\overline{DEC}$ becomes "0" to disable the gate 139 and effect release of the reverse clutch RC, and the signal DEC becomes "1" to cause engagement of the brake BR.

(10) As explained hereinbefore, as soon as the table begins its reverse movement from the point 175c (FIG. 11), the state of the flip-flop FFc is reversed, so that the register-counter 52 is conditioned to count downwardly. Thus, while the table is moving in a negative direction (i.e., opposite to its originally commanded direction) the contents of the counter 52 continuously represent the error distance.

(11) The engagement of the brake BR causes the table 15 to decelerate (curve portion 175e, FIG. 11) until it comes to a second stop at the point 175f. It is assumed that by this time the table is within less than .040" of the desired final stopping point, so that the proximity signal $C<40$ is a binary "1" level. Thus, when the table stops at point 173f and the zero speed signal ZS switches to a binary "1" level, such signal is transmitted through the enabled gate 146 to reset the flip-flop FF2. The signal HI is thereby changed to a binary "0" level to disable the gate 144 and disengage the brake BR. At the same time, the signal LO is switched to binary "1" level so that the gate 156 is qualified to produce an output signal ESM, causing the pulse driver 49 to energize the step motor 45. At this time, the direction signal D— is a binary "1," so that the step motor drives the table in a negative direction as illustrated by curve portion 175g (FIG. 11).

(12) When the number in the register-counter is reduced to zero and the zero count signal ZC is again switched to binary "1" value, that signal acts through the qualified gate 148 to reset the flip-flop FF1 so that the signals RUN and STOP are restored to "0" and "1," respectively. Thus, the gate 156 is disabled and the energization of the step motor 45 is terminated to stop the table precisely with the originally commanded displacement. Moreover, the STOP signal causes the brake BR to be engaged, and it also qualifies the gate 150 so that, after Y axis positioning is completed, the tape reader 51 is restarted to read the next block from the punched tape 50.

Although the organization and operation of the control system here disclosed has been here described with reference to commanded displacements in a positive direction, a moment's study will confirm that the system functions equally well and in substantially the same manner to execute commanded displacements in a negative direction. In the latter instances, the reading of a minus direction code from the punched tape will result in a —X signal from the gates 66 so that the flip-flop FFd will initially be placed in its reset state (D—="1"), and initial drive of the table will therefore be through the reverse clutch RC. Moreover, when the step motor 45 is energized, it will move the tape in a negative direction unless, of course, the flip-flop FFd has been toggled due to overshooting by the table beyond the desired stopping point, as explained above.

The graphical representations of velocity versus displacement in FIGS. 6–10 are not intended accurately to represent quantative relationships, and it should be understood that such graphs have been generalized and exaggerated in order to illustrate the qualitative relationships and the sequences of the velocities and directions of motion as the controlled part starts from an original position and ends up with the commanded displacement.

Under the various and diverse circumstances which can arise, the control system here disclosed as a preferred embodiment of the invention functions to translate the controlled part or table 15 through commanded displacements by high speed drive, and such high speed translation is maintained as long as practically possible in order to reduce to a minimum the required operating time. When the high speed drive is terminated, a brake is applied to stop the movable part quickly, and the instant at which braking occurs is established by the slow down signal SD produced from the function generator 76 in a manner such that the part stops either exactly with the commanded displacement or very closely thereto. If for any reason the part stops with a relatively great error, the high speed drive is resumed. And if the part stops with a reasonably small error, then it is driven at a low velocity, during a relatively short time and in either direction until that error is reduced to zero. The selection of an arbitrary monotonic function, by adjustments made in the function generator, may be made with the objective of having the brake initially stop the part exactly in the commanded position, and there is no need to set the system conservatively so that small overshoot can never occur. In the even that subsequent changes in the brake characteristics on the system inertia result in either undershoot or overshoot, the part will be finally positioned by slow speed drive. Because of these features, the time required for moving a controlled part from one position to the next is kept very small, and the efficiency of a controlled machine such as the vertical drill illustrated in FIG. 1 is greatly enhanced.

I claim as my invention:

1. In a system for translating a movable part through a commanded distance, the combination comprising a continuously running motive power source, a selectively engageable clutch interposed between said source and said part for selectively driving the latter at a high speed, a selectively engageable brake coupled to the movable part to decelerate and stop the latter, means for producing a first signal which continuously represents the error distance constituted by the difference between the commanded distance and the executed displacement of the part as such error distance varies to take on different values, means for producing a second signal which continuously represents the velocity of the part as such velocity takes on different values, means for engaging said clutch and holding said brake released to initiate high speed displacement of said part pursuant to a commanded distance, and means responsive to said first and second signals for releasing said clutch and engaging said brake at an instant when the error distance has been reduced to an amount which is related to the value of the part velocity then existing, said amount being variable with different values of said velocity but always substantially equal to the distance which the part will travel before stopping upon engagement of the brake when the part is moving at the then existing velocity, thereby to halt the part after it has executed a total displacement substantially equal to the commanded distance.

2. The combination set forth in claim 1 further characterized by selectively operable means for driving said part at a low speed compared to said high speed, and means responsive to stopping of the part by said brake for rendering said low speed drive means effective to continue movement of the part only if and so long as the executed displacement does not precisely equal the commanded displacement.

3. The combination set forth in claim 2 further characterized by means for producing a proximity signal only when the error distance is less than a predetermined small value, and means responsive to stopping of said part by said brake in the absence of said proximity signal for precluding operation of said low speed drive means and instead causing release of said brake and reengagement of said clutch.

4. In a system for translating a movable part through a numerically commanded distance, the combination comprising a continuously running motor and a selectively engageable clutch coupled to the part for driving the latter at relatively high speeds, a selectively engageable brake coupled to the part for decelerating and stopping the latter, a low speed motor drivingly coupled to the part for driving the latter at a relatively low speed, first means for continuously signaling the distance error constituted by the difference between the commanded distance and the distance moved by the part, second means responsive to said signaling for engaging said clutch and disengaging said brake so long as the distance error is greater than a first preselected value and for disengaging said clutch and engaging said brake when the distance error becomes less than said first value, said first predetermined value being selected with reference to the braking and inertia characteristics of the system so that engagement of the brake stops the part with the distance error reduced approximately to zero, third means operative only if the brake does not stop the part with zero distance error and responsive jointly to (a) the movable part having substantially zero velocity and (b) the distance error signaled by said signaling means being less than a second predetermined value which is less than the first value for disengaging said brake and rendering said low speed motor effective to drive the movable parts, and fourth means responsive to said signaling means for terminating drive by said low speed motor when the error distance is reduced to zero.

5. The combination set forth in claim 4 further characterized in that said second means includes means for making said first preselected value a pre-established monotonic function of the velocity of the movable part, whereby the greater is the velocity of said part the greater is said first preselected value.

6. The combination set forth in claim 4 further characterized in that said low speed motor is a step motor.

7. In a system for quickly translating a movable part precisely through a numerically represented command distance, the combination comprising a continuously running source of motive power, a clutch interposed between said source and said part and selectively engageable to accelerate and drive the part at a high velocity, a brake coupled to the part and selectively engageable to decelerate and stop the part, a step motor drivingly coupled to the part for translating the latter at a low velocity, signaling means initially settable to numerically signal a command distance, feedback means for causing said signaling means to numerically signal continuously the error distance constituted by the difference between the commanded distance and the executed displacement of the part, means for producing a slowdown signal when the signaled error distance falls below a first preselected value which is a monotonic function of the instantaneous velocity of the part, means for producing a proximity signal so long as the signaled error distance is less than a second predetermined value which is smaller than said first value, means for producing a zero speed signal whenever the velocity of said part is substantially zero, means responsive to the setting of a command distance number into said signaling means for engaging said clutch and precluding engagement of said brake, means responsive to said slowdown signal for disengaging said clutch and engaging said brake thereby to cause the part to be braked to a stop, means responsive to the appearance of said zero speed signal after such engagement of the brake for releasing the brake and rendering said stepping motor effective to drive said part at a low velocity, and means responsive to said signaling means for terminating the drive by said stepping motor when the error distance becomes zero.

8. In a system for translating a movable part through a commanded distance, the system including a continuously running motor, a selectively engageable clutch interposed between the motor and the part to selectively drive the latter at a high speed, a selectively engageable brake associated with the part to selectively decelerate and stop the latter, and a step motor coupled to the part to drive the latter at a low speed; an improved control apparatus comprising first means to continuously signal the error distance constituted by the difference between the commanded distance and the executed displacement of the part, second means responsive to said first means for engaging said clutch and holding said brake disengaged so long as the error distance exceeds a first preselected value, third means responsive to said first means for disengaging said clutch and engaging said brake when the error distance does not exceed said first preselected value thereby to brake the part to a stop, fourth means for producing a zero speed signal when the part comes to a stop, fifth means responsive to said zero speed signal but only if the distance error then signaled by said first means is not zero for releasing said brake and rendering the step motor effective to drive the part at a low speed, and sixth means operative in response to the distance error signaled by said first means reaching zero for terminating the drive by said step motor.

9. The combination set forth in claim 8 further characterized by means for producing a first signal which varies as a monotonic function of the speed of the movable part, means for producing a second signal which varies in proportion to the distance error, means for producing a slowdown signal when the second signal becomes equal to or less than the first signal, and means for actuating said third means in response to said slowdown signal, whereby the clutch is disengaged and the brake is engaged when the error distance is reduced to the said first preselected value and the latter is a monotonic function of the part velocity.

10. In a system for translating a movable part through a numerically commanded distance, the combination comprising a continuously running motor, a selectively engageable clutch interposed between said motor and said part to drive the latter at a relatively high speed, a selectively engageable brake coupled to said part, a selectively operable step motor coupled to said part, a digital pulse counter, means responsive to signals representing a commanded distance for presetting into said counter a number corresponding to the commanded distance, means for generating a feedback pulse for each increment of movement by said part, means for causing said counter to count down in response to the feedback pulses so that the number held in said counter dynamically changes to represent the error distance constituted by the distance between the commanded distance and the executed displacement of the part, means responsive to the presetting of a command number into said counter for engaging said clutch and holding said brake released, means responsive to the reduction of the count in said counter below a first preselected value for releasing said clutch and engaging said brake thereby to stop the part with exactly or approximately the commanded displacement, means responsive to stopping of the part and the concurrent existence of a count other than zero in said counter for rendering said step motor effective to drive the part, and means responsive to the existence of a zero count in said counter for terminating or precluding both engagement of said clutch and operation of said step motor.

11. The combination set forth in claim 10 further characterized by means for producing a first analog signal which by its magnitude represents the number held in said counter, means for producing a second analog signal which by its magnitude represents the velocity of the part, means responsive to said second signal for producing a third analog signal which by its magnitude represents a monotonic function of the velocity of the part, and means for producing a response signal at the instant that said third signal exceeds said first signal to indicate that the count in the counter has been reduced below said preselected value.

12. In a system for translating a movable part through a numerically commanded distance, the combination comprising means continuously signaling the error constituted by the difference between the commanded distance and the distance moved by the part in response to such command, means responsive to said signaling means for accelerating said part to a high speed and driving it at such high speed so long as the error is greater than a preestablished monotonic function of the velocity of the part, means responsive to the error becoming less than such monotonic function value for terminating the high speed drive and braking the part to a stop, means responsive to such stopping of the part but only if the error is then greater than a predetermined value for terminating the braking action and reactivating said high speed accelerating and driving means whereby said last-named means will thereby again act to brake the part to a stop, and means responsive to such stopping of the part but only if the signaled error is then less than said predetermined value but greater than zero for driving the part at a low speed until the signaled error is reduced to zero.

13. In a system for translating a movable part through a numerically commanded distance, the combination comprising a continuously running motor, a selectively engageable clutch interposed between said motor and said part to drive the latter at high speed, a selectively engageable brake coupled with said part to decelerate and stop the latter, a step motor coupled to said part to drive the latter at low speed, signaling means initially settable to signal the commanded distance, feedback means for adjusting said signaling means to make the latter signal the error distance constituted by the difference between the commanded distance and the executed displacement of the part, means responsive to said signaling means for producing a slowdown signal when the error distance is less than a first value which is a monotonic function of the velocity of the part, means responsive to said signaling means for producing a proximity signal when the error distance is less than a second predetermined value, means responsive to said signaling means for producing a zero speed signal when the part has zero velocity, means responsive to setting of said signaling means to represent a commanded distance for engaging said clutch and holding said brake disengaged so that the part is accelerated and driven at high speed, means thereafter responsive to said slowdown signal for releasing said clutch and engaging said brake so that the part decelerates to a stop, means responsive to said zero speed signal for (a) disengaging said brake and engaging said clutch or (b) disengaging said brake and rendering said step motor effective to drive the part at low speed if when the zero speed signal appears said proximity is (a) absent or (b) present, respectively, and means responsive to said signaling means for terminating the drive by said step motor when the distance error becomes zero, whereby braking of the part to a stop while the distance error is greater than said second predetermined value will result in resumption of high speed drive by said clutch until the slowdown signal reappears and the resulting braking action stops the part with an error distance less than said second predetermined value.

14. In a system for translating a movable part through a commanded distance, the combination comprising a continuously running motor, a selectively engageable clutch interposed between the motor and the part to drive the latter along its path of movement, a selectively engageable brake coupled to the part, means responsive to command distance signals for engaging said clutch and holding said brake disengaged to drive the part, means for creating a first signal indicative of the error constituted by the difference between the commanded distance and the distance which the part has moved, means for creating a second signal indicative of the velocity of the part, means for creating a third signal which is a predetermined monotonic function of said second signal, means for comparing said first and third signals and for producing a fourth signal only when the third signal is greater than the first signal, and means responsive to said fourth signal for releasing said clutch and engaging said brake, whereby the error distance at the instant of brake engagement is greater by a monotonic relationship when the velocity of the part is greater so that the part is braked to a stop with the distance error approximately zero.

15. In a system for translating a movable part through a commanded distance, the combination comprising means responsive to command information for accelerating said part and driving it, a selectively engageable brake operative to retard and stop the part, means for continuously signaling the error constituted by the difference between the commanded distance and the distance moved by the part, means for sensing the velocity of the part and signaling the value of a stopping distance which is a nonlinear, monotonic function of the sensed velocity, the signaled stopping distance varying with the sensed velocity and being substantially equal to the distance the part will travel before stopping if the brake is engaged at an instant when the part velocity has different values, and means responsive to the signaled error and the signaled stopping distance for terminating the drive of the part and engaging said brake when the error is reduced to a value which is substantially equal to the signaled stopping distance, so that the error is reduced approximately to zero by the time the part stops.

16. In a system for translating a movable part through a numerically commanded distance, the combination comprising means for continuously signaling the error constituted by the difference between the commanded distance and the distance moved by the part, means for continuously signaling the velocity of the part, means responsive to the signaled error and the signaled velocity for producing a slowdown signal at the instant the error is reduced to a value which is a monotonic function of the signaled velocity, power driving means actuated to accelerate and drive said part in response to receipt of command distance representing signals, and means responsive to said slowdown signal for deactuating said power driving means and braking said part to a stop, whereby the braking action is initiated while the error distance is greater when the part velocity is higher, and the part comes to rest with the error reduced approximately to zero.

17. In a system for locating a movable part in a commanded position displaced from an absolute or a starting reference point, the combination comprising power means selectively actuatable to drive the part toward the commanded position; a selectively actuatable brake associated with the part; first means for continuously signaling the error displacement of the part from the command position while said power means are actuated and the part is moving; a function generator including means for sensing the velocity of the part and producing a signal which continuously represents a stopping distance which is a non-linear, monotonic function of the sensed velocity; said function generator having means to cause said signal to represent, for any value of sensed velocity, the distance which the part will travel after actuation of said brake on account of the retardation characteristics of the particular brake employed and the inertia and friction factors associated with the particular movable part employed; and means responsive to said first means and said function generator for deactuating said power means and actuating said brake at an instant when the signaled error displacement becomes substantially equal to the signaled stopping distance.

18. The combination set forth in claim 17 further characterized in that said function generator includes adjustable means for shaping the relationship of the magnitude of said signal versus the sensed velocity, thereby to afford the matching of the monotonic function to different brake retardation characteristics and different inertia and friction factors.

References Cited

UNITED STATES PATENTS

| | | | |
|---|---|---|---|
| 2,748,665 | 6/1956 | Senn | 192—141 |
| 3,040,603 | 6/1962 | Benton | 77—32.2 |
| 3,063,311 | 11/1962 | Beckwith et al. | 77—32.2 |
| 3,157,261 | 11/1964 | Bond | 192—142 |
| 3,174,450 | 3/1965 | Becker et al. | 192—18.2 |
| 3,190,139 | 6/1965 | Swanson et al. | 74—365 |
| 3,253,484 | 5/1966 | Hill | 77—32.2 |
| 3,324,364 | 6/1967 | Caruthers | 318—20.260 X |

MARTIN P. SCHWADRON, *Primary Examiner.*

CHARLES M. LEEDOM, *Assistant Examiner.*

U.S. Cl. X.R.

77—32.2; 90—13.9